(12) United States Patent
End, III

(10) Patent No.: US 7,343,457 B1
(45) Date of Patent: Mar. 11, 2008

(54) DUAL ACTIVE BANK MEMORY CONTROLLER

(75) Inventor: Joseph H. End, III, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 512 days.

(21) Appl. No.: 10/632,872

(22) Filed: Aug. 1, 2003

(51) Int. Cl.
G06F 12/00 (2006.01)
G06F 13/30 (2006.01)
G06F 13/18 (2006.01)
G06F 13/28 (2006.01)
G06F 15/167 (2006.01)

(52) U.S. Cl. .................. 711/150; 711/111; 711/113; 711/114; 711/130; 711/162; 711/154; 711/158; 711/160; 711/167; 711/168; 711/104; 711/105; 711/5; 711/106; 711/163; 709/213

(58) Field of Classification Search ............. 711/111, 711/113, 114, 130, 150, 162, 104, 105, 5, 711/106, 163, 160, 158, 154, 167, 168; 709/213
See application file for complete search history.

(56) References Cited

U.S. PATENT DOCUMENTS

| | | | | |
|---|---|---|---|---|
| 4,683,533 A | * | 7/1987 | Shiozaki et al. ............. 709/213 |
| 4,789,960 A | | 12/1988 | Willis | |
| 5,623,311 A | | 4/1997 | Phillips et al. | |
| 5,742,792 A | * | 4/1998 | Yanai et al. ................. 711/162 |
| 6,000,019 A | | 12/1999 | Dykstal et al. | |
| 6,487,648 B1 | | 11/2002 | Hassoun | |
| 6,985,994 B2 | * | 1/2006 | Kanai et al. ................ 711/111 |
| 7,193,994 B1 | * | 3/2007 | Payson ....................... 370/380 |
| 2002/0194435 A1 | * | 12/2002 | Yamagami et al. ........ 711/150 |
| 2004/0088472 A1 | * | 5/2004 | Nystuen et al. ............... 711/5 |

* cited by examiner

Primary Examiner—Hyung S. Sough
Assistant Examiner—Mardochee Chery
(74) Attorney, Agent, or Firm—Richard J. Bregson; Robert P. Marley; RatnerPrestia

(57) ABSTRACT

A memory controller for managing memory requests from a plurality of requesters to a plurality of memory banks is disclosed. The memory controller includes an arbiter, a first path controller, a second path controller, and a synchronizer. The arbiter is configured to receive the memory requests from the plurality of requesters and identify requests for processing responsive to the requested memory banks. The first and second path controllers are coupled to the arbiter and the plurality of memory banks with the first path controller configured to process the first memory request and the second path controller configured to process the second memory request. The synchronizer is coupled between the first path controller and the second path controller for synchronizing the first and second path controllers such that the first and second memory requests processed by the first and second path controllers, respectively, do not conflict.

10 Claims, 21 Drawing Sheets

DUAL ACTIVE BANK MEMORY CONTROLLER

FIELD OF THE INVENTION

The present invention relates to memory systems and, more particularly, to external memory controllers for managing memory requests to multiple memory banks.

BACKGROUND OF THE INVENTION

Present memory devices such as synchronous dynamic random access memory (SDRAM) devices typically contain multiple memory banks in which each memory bank includes an internal bank controller and a corresponding independent block of memory, e.g., SDRAM memory. Often multiple requesters (e.g., microprocessors, direct memory access devices, etc.) are configured to access the same memory device. The memory banks share a common external interface having a data buss, an address buss, and a control buss, which enables access of the memory banks by the multiple requesters. In conventional systems, a single external controller is coupled between the memory requesters and the memory device to manage the access of the memory device by the requesters such that conflicts do not occur on the busses or within the memory device.

To access the memory device, one or more of the memory requesters generates a memory request requesting access to specified memory banks within the memory device. The external controller receives the requests and selects one request at a time to access the memory device. The external controller then executes a control sequence that connects with the appropriate internal bank controller of the memory bank identified in the selected request and begins a cycle of activating the memory bank, loading the memory address, and transferring a burst of data to or from the memory block of the activated memory bank. Depending upon the direction of the transfer, data is passed either from the memory device to the requester (i.e., read from the memory device) or from the requester to the memory device (i.e., written to the memory device).

The external controller activates only one of the multiple memory banks at a time, referred to herein as the "active" bank. During each activation, the external controller either issues a read command to read data from the active bank or a write command to write data to the active bank. Typically, the remaining "non-active" banks "refresh" and/or "precharge" during the time when another memory bank is active. The amount of time used to refresh and precharge these memory banks, however, is typically much less than the amount of time available for such activities. Thus, the memory banks as a whole are underutilized. In addition, depending on the amount of data being transferred during each data exchange with the memory device, one or more of the data, address, and command busses are often underutilized as well.

There is an ever-present need to improve the bandwidth and latency of memory systems. The inventor has recognized that improvements in bandwidth and latency are achievable by more fully using the existing underutilized memory bank and buss resources. The present invention fulfils the need for improved bandwidth and latency of memory systems among others.

SUMMARY OF THE INVENTION

The present invention includes a memory controller for managing memory requests from a plurality of requesters to a plurality of memory banks. The memory controller includes an arbiter, a first path controller, a second path controller, and a synchronizer. The arbiter is configured to receive the memory requests from the plurality of requesters and identify requests for processing responsive to the requested memory banks. The first and second path controllers are coupled to the arbiter and the plurality of memory banks with the first path controller configured to process the first memory request and the second path controller configured to process the second memory request. The synchronizer is coupled between the first path controller and the second path controller for synchronizing the first and second path controllers such that the first and second memory requests processed by the first and second path controllers, respectively, do not conflict.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" represents a non-specific number of elements. Also, lines without arrows connecting components may represent a bi-directional exchange between these components. Included in the drawings are the following features.

DETAILED DESCRIPTION OF THE INVENTION

Figure 1:
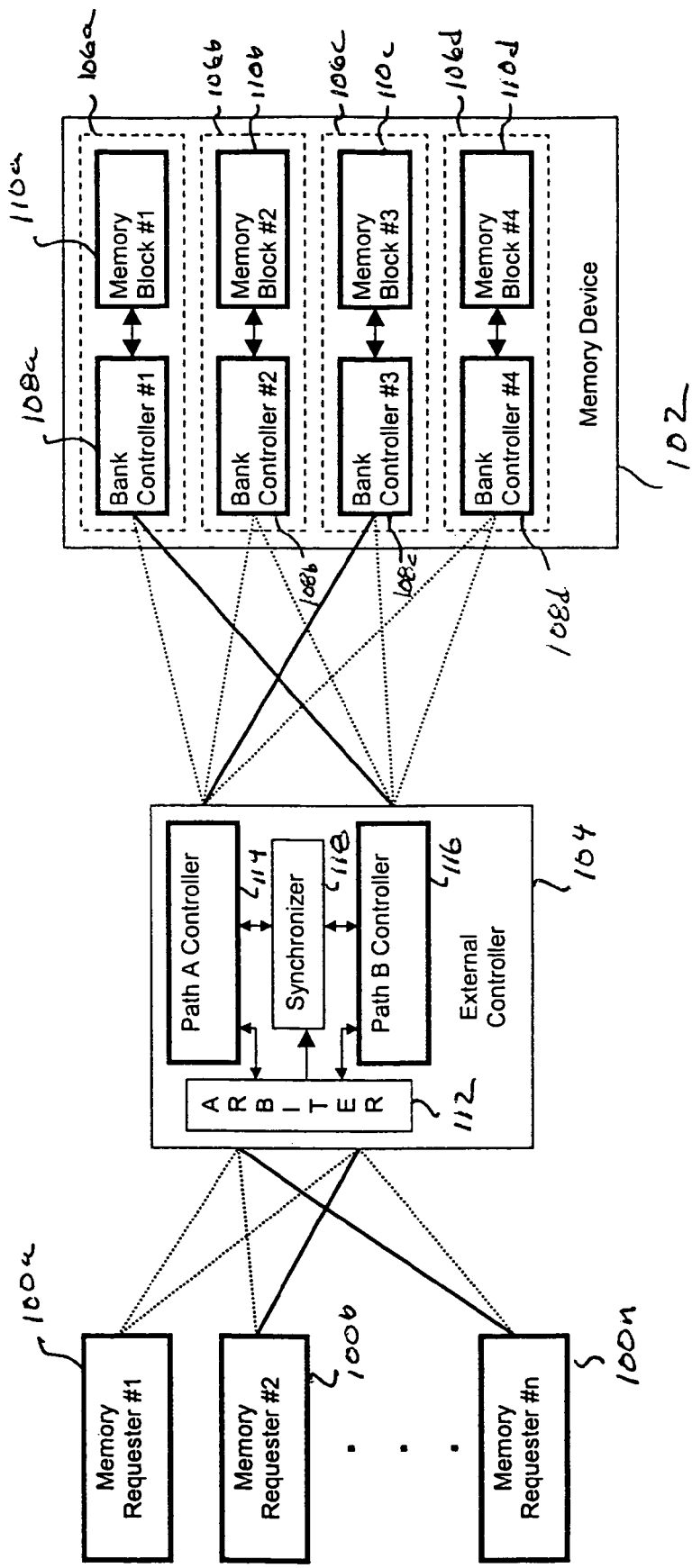
FIG. 1 is a block diagram of an exemplary memory request management system in accordance with one aspect of the present invention.

FIG. 1 depicts a block diagram for describing an overview of a memory access system in accordance with the present invention. In an exemplary embodiment, a plurality of requesters 100a-n access a memory device 102 through an external memory controller 104. In an exemplary embodiment, the plurality of memory requesters 100 are single memory command type devices, e.g., microprocessor(s), direct memory access (DMA) devices, etc. Although a plurality of memory requesters 100 are illustrated, it is contemplated that the present invention may be advantageously employed with one memory requester as well, e.g., by queuing requests behind a single memory requester port.

The illustrated memory device 102 includes four memory banks 106a-d. Each illustrated memory bank 106a-d includes an internal bank controller 108a-d and a corresponding memory block 110a-d. In an exemplary embodiment, the memory device 102 is a conventional SDRAM memory device, which will be used hereinafter to describe the invention in detail. Although the invention is described in detail using a n SDRAM memory device, it is contemplated that the present invention may be applicable to other types of memory devices as well. In addition, although the illustrated memory device 102 includes four memory banks 106, memory devices with essentially any number of two or more memory banks can be used in accordance with present invention.

The external controller 104 manages memory requests from the plurality of requesters 100 to the memory banks 106 of the memory device 102 such that multiple memory banks 106 can be active concurrently. The illustrated external controller 104 includes an arbiter 112, a first path controller 114 (the path A controller), a second path controller 116 (the path B controller), and a synchronizer 118. Although two path controllers are described and illustrated, it is contemplated that additional path controllers may be employed to allow even more memory banks to be active concurrently if sufficient bandwidth is available on the data, address, and command busses. In an exemplary embodiment, the external controller 104 (including the arbiter 112, the first and second path controllers 114 and 116, and the synchronizer 118) is implemented as a field programmable gate array (FPGA).

The arbiter 112 receives memory requests from the memory requesters 100 and selects memory requests for processing by the path A controller 114 and the path B controller 116. In an exemplary embodiment, the arbiter 112 selects one of the requests for forwarding to the path A controller 114 or the path B controller 116 depending upon which path controller 114 or 116 is idle and whether the requested memory bank is different from the memory bank presently activated by the other path controller. In an exemplary embodiment, comparator circuitry, described below, compares the bank address field of the incoming request with the bank address field of the request in progress on the other path controller to determine if the request may proceed.

In an exemplary embodiment, the arbiter 112 performs its function by running a "fairness" arbitration cycle. In accordance with this embodiment, each requester is granted access to the memory device no more than once per arbitration cycle. In addition, each arbitration cycle may end without granting access to every requester in the absence of a request from a unique requester. Thus, a new arbitration cycle may begin prior to granting access to each requester to enable the allocation of additional bandwidth to high demand requesters. Accordingly, the arbitration cycle grants access to one or more of the requesters per arbitration cycle depending upon demand such that all requesters 100 have equal access to the memory device 102, no requester 100 dominates, and no requester 100 is limited in access to the memory device 102 any more than the others.

The path A controller 114 and the path B controller 116 process memory requests assigned by the arbiter 112. These controllers generate control sequences to activate a bank, issue commands, transfer addresses, and exchange data. In an exemplary embodiment, the path controllers 114 and 116 are responsible for generating the precise signal timing sequences used to perform operations associated with the memory device 102. In addition, the path controllers also control the timing of the application of selected address fields to the address buss and of the enabling of data to the data buss. In an exemplary embodiment, each path controller has its own read and write command sequences implemented in state machines. Each controller may be in any of its control sequence states independent of the other. Accordingly, each controller may independently control any of the bank controllers 108a-d.

When activating two banks 106 concurrently, the external controller 104 concatenates read and write command combinations. In order to optimally concatenate these commands in any order, the system enforces a dynamically changing timing relationship between the controllers 114 and 116. The synchronizer 118 is positioned between the path controllers to control timing relationships between the two path controllers. The synchronizer 118 synchronizes the controllers 114 and 116 with respect to one another in order to concatenate the commands such that conflicts on the control, address, and data busses are avoided. As used hereinafter, read and write commands by the path A controller are referred to as READ-A and WRITE-A, respectively. Likewise, read and write commands by the path B controller are referred to as READ-B and WRITE-B, respectively. The relationship between the path A controller and the path B controller is different for each of READ-A-READ-B, WRITE-A-READ-B, READ-A-WRITE-B, and WRITE-A-

WRITE-B possible concatenation of commands by the two path controllers, which is described in detail below.

In an exemplary embodiment, at least one path controller, e.g., the path A controller, also executes an initialization sequence and a refresh sequence. In accordance with this embodiment, the path controller executes an initialization sequence that performs the operations necessary to load the operating parameters into the memory device 102 and also performs the initial precharge and refresh cycles which precede the transfer of data in conventional memory devices. In addition, the path controller performs the refresh cycles of the memory device. In an exemplary embodiment, only one path controller is needed to perform these functions. It is contemplated that two or more path controllers may be used to perform these functions with specific functions delegated to specific path controllers or all functions provided by all path controllers.

Through the use of two path controllers, the external controller 104 is able to activate two memory banks concurrently. In the illustrated embodiment, lines (both dashed and solid) represent potential connections between the memory requesters 100 and the external controller 104 and between the external controller 104 and the memory device 102. The solid lines represent current memory requests that are being processed by the external controller 104 to access the banks 106 of the memory device 102. In the illustrated embodiment, memory requests from two memory requesters 100b and 100n are being processed by the external controller 104. In this illustrated embodiment, the arbiter 112 assigns the request from memory requester 100n to the path A controller 114 and the request from memory requester 100b to the path B controller 116. It is assumed that requester 100n is presently requesting access to memory bank 106c and requester 100b is presently requesting access to memory bank 106a. The path A controller 114 activates memory bank 106c in accordance with the request from requester 100n and the path B controller 116 activates memory bank 106a in accordance with the request from requester 100b. Thus, in this embodiment, two memory requesters have memory cycles in progress to two internal bank controllers simultaneously. It should be noted that the arbiter 112 prevents two requests to the same memory bank from being serviced concurrently.

An exemplary embodiment of the present invention will now be described in detail with reference to FIG. 2. In general overview, the requesters 100 submit memory requests to the arbiter 112. In the illustrated embodiment there are five requesters 100a-e (i.e., requester 0-requester 4). The arbiter 112 receives the memory requests from the requesters 100 and selectively assigns the requests to the path A controller 114 (including path A circuitry 202, path A timing controller 208, and components of high speed address and data muxes 206) and, if appropriate, to the path B controller 116 (including path B circuitry 204, path A timing controller 210, and components of the high speed address and data muxes 206). The arbiter 112 assigns the requests dependent upon the present set of requests, the bank address fields of those requests, and the bank address of any memory requests currently being processed by either path controller. The arbiter 112 then forwards address and data information associated with each assigned memory request through an appropriate path to the high speed address and data muxes 206, i.e., through path A via the path A circuitry 202 if the request is assigned to the path A timing controller 208 and through path B via path B circuitry 204 if the request is assigned to the path B timing controller 210. Also, the arbiter 112 generates a request for a memory cycle to the path A timing controller 208 and, if appropriate, to the path B timing controller 210. The path A controller and, if appropriate, the path B controller then activate the appropriate bank(s) of the memory device 102, which in this embodiment is a conventional SDRAM, and control the flow of data through the high speed address and data muxes 206 to the activated banks. The synchronizer 118 synchronizes the operations of the path A timing controller 208 and the path B timing controller 210 to prevent conflicts on command, data, and address busses and within the memory device 102.

Figure 2:
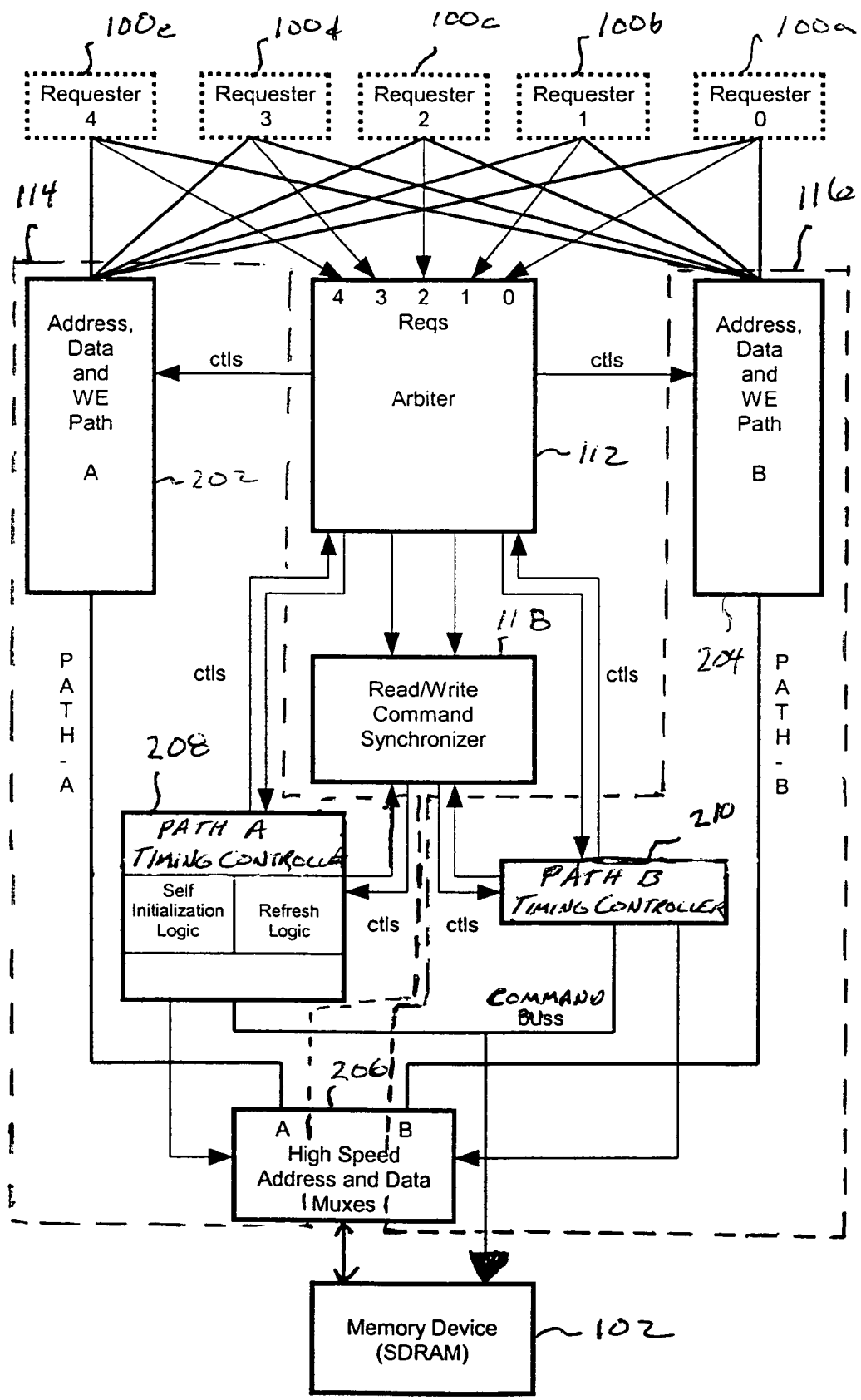
FIG. 2 is a block diagram of an exemplary dual active bank controller in accordance with one aspect of the present invention.
Figure 3:
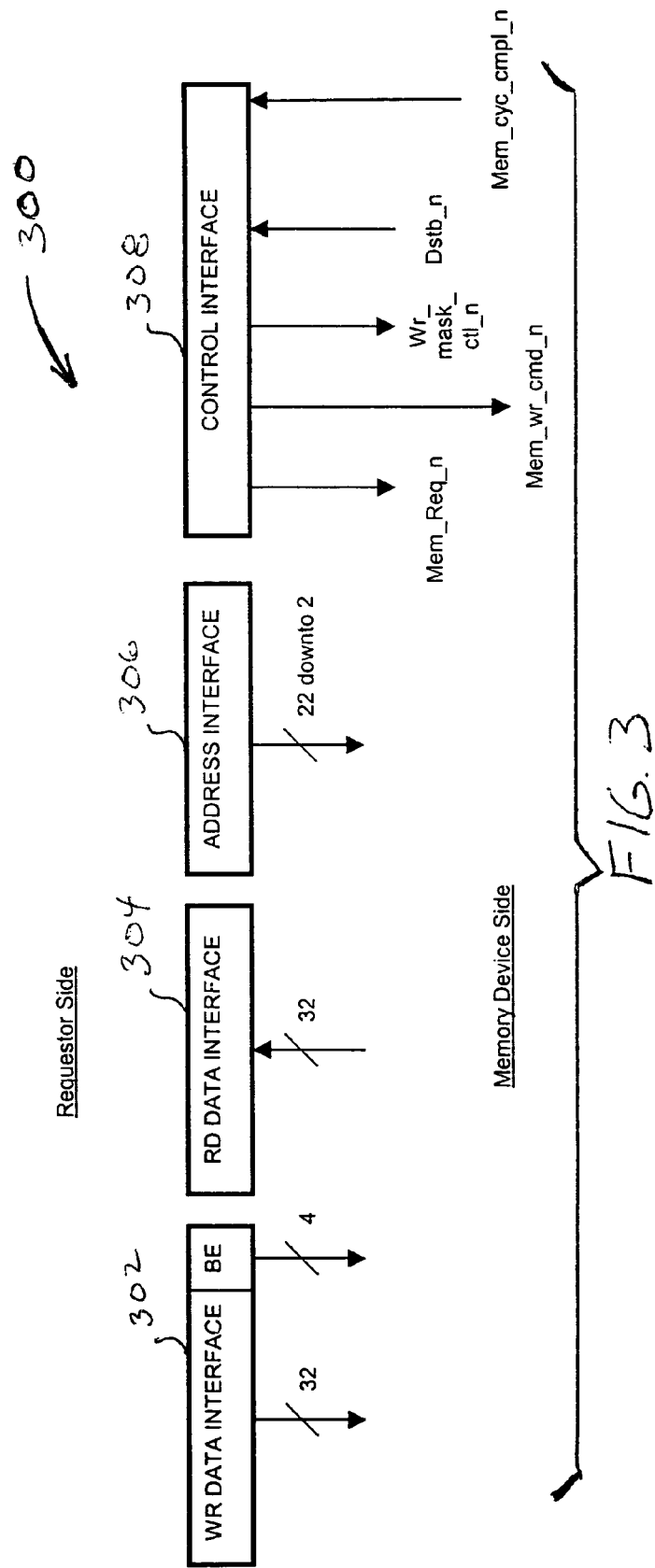
FIG. 3 is a block diagram of an exemplary interface between a requester and a memory request management system in accordance with one aspect of the present invention.

FIG. 3 provides details of an exemplary memory requester interface 300 for interfacing with data, address, and control busses. The memory requester interface 300 includes a write (WR) data interface 302, a read (RD) data interface 304, an address interface 306, and a control interface 308. The write data interface 302 includes 32 data bits and 4 byte enable bits (BE/), i.e., one for each byte assuming data is passed in double word (dword) blocks. The byte enable bits control writes at the byte level. The requesters 100 (FIG. 2) provide BE/ bits with the same timing as write data. The read data interface consists of 32 data bits but does not include BE/ bits, since, in an exemplary embodiment, data is always returned in all four byte positions on reads. In accordance with this embodiment, the requesters 100 (FIG. 2) are configured in a known manner to discard unnecessary data.

The address interface 306 interfaces with an address buss. The address interface 306 includes 21 bits (i.e., bit 22 down to bit 2). Address bits 0 and 1 are not provided since reads are addressable only down to the dword level and writes are addressable by the BE/ signals in this embodiment. Two of the 21 bits are selected to address individual memory banks 106 (FIG. 1), e.g., bits 6 and 7. Because four memory banks are used in this exemplary embodiment, the banks are represented individually by the 2 bank address bits (e.g., 00, 01, 10, 11). More or fewer memory bits may be employed to accommodate different numbers and sizes of memory banks.

The control interface 308 interfaces with a control buss. The requesters 100 (FIG. 2) simultaneously provide memory request signals (Mem_req_n—abbreviated "req_n") and a write command signals (Mem wr_cmd_n—abbreviated wr_cmd_n) to the control interface 308 to request write or read transactions. Req_n is true for both reads and writes. Wr_cmd_n is true only for writes. A request is signaled by pulsing req_n or both req_n and wr_cmd_n for one clock period. A requester must wait for memory cycle complete signal (Mem_cyc_cmpl_n-abbreviated "cyc_cmpl_n") before signaling another request. A transaction length signal is not required in this exemplary embodiment because all transactions are assumed to have a fixed length, e.g., four dwords or other fixed number of words.

The requester 100 also provides a write mask control signal (Wr_mask_ctrl_n-abbreviated "mask_n") via the control interface 308. This signal supports requesters that transfer less than four dwords on write operations by essentially forcing the byte enable bits to false during the time within a data burst when valid data is not present. This signal is not permitted to change once it signals an inhibit. When a portion of a four dword burst is inhibited, one to three dwords are transferred followed by three to one clock periods of write inhibit. In all cases, four clock periods of data burst must be controlled. The mask_n signal has the same timings as the presentation of the dword on the interface and overrides the BE/ bits when TRUE.

The path timing controllers 208 and 210 provide a data strobe control signal (Dstb_n) which is TRUE for the four clock periods when burst data is transferred. The requester 100 supplies data, BE/s, and control mask_n on writes or accepts data on reads for each clock period of the data strobe. On writes, data and BE/s from the requester are permitted to be invalid for dstb_n clock periods in which mask_n is TRUE.

In the exemplary embodiment, the path timing controllers 208 and 210 signal when the transaction is complete by driving the mem_cyc_cmpl_n TRUE coincident with the last dword of the transaction.

The addresses presented by the set of requesters in an example embodiment of the invention affect the processing of the arbiter 112 and path timing controllers 208 and 210. The address itself is divided into fixed fields of varying length and is presented to high-speed address and data multiplexers 206 (FIG. 2) where these fields are, in some instances, concatenated with control information and presented to the memory device 102 address input ports with precisely and optimally controlled timings. The bank address field of the address is used for two purposes. It is used in bank comparator logic within the arbiter 112, described below, to make decisions on whether a second memory bank may be activated. The bank address bits are also presented to the high-speed address and data multiplexers 206 for presentation to the memory device 102 bank address input ports with precise and optimum timings.

Figure 4:
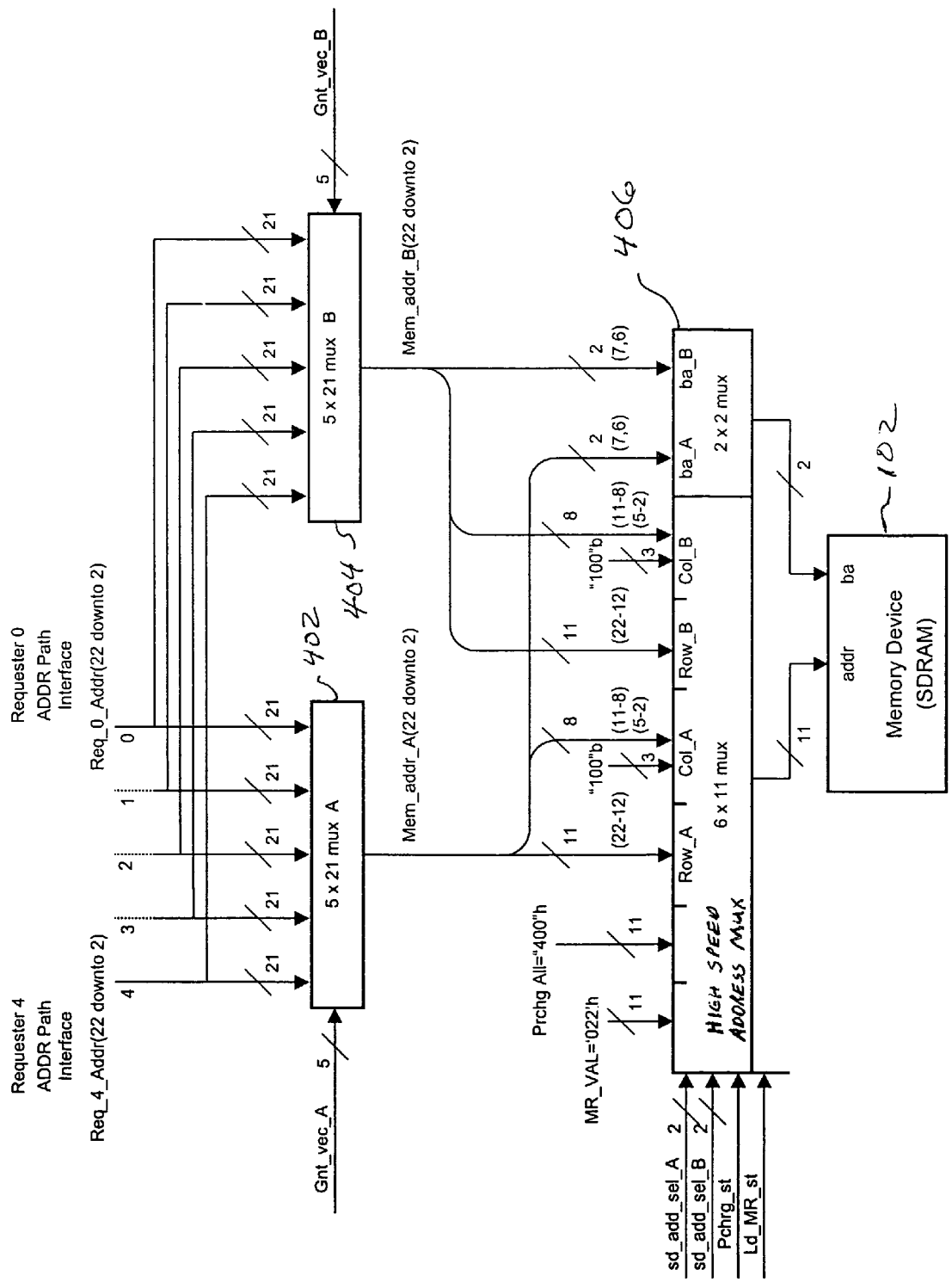
FIG. 4 is a block diagram of exemplary address path components in accordance with one aspect of the present invention.

FIG. 4 provides details of the address paths. The illustrated circuitry includes a path A address multiplexer 402, a path B address multiplexer 404, and an address multiplexer 406 that is part of the high-speed address and data multiplexers 206 (FIG. 2). The path A address multiplexer 402 and the path B address multiplexer 404 each contain input ports associated with unique requesters for receiving addresses concurrently from these requesters 100 (FIG. 2). In addition, the path A and B address multiplexers 402 and 404 receive path A and B grant vectors (Gnt_vec_A and Gnt_vec_B), respectively, generated by the arbiter 112 (FIG. 2) for selecting which requester's addresses are passed. The path A address multiplexer 402 and the path B address multiplexer 404 form part of the path A circuitry 202 (FIG. 2) and the path B circuitry 204 (FIG. 2), respectively. In the illustrated embodiment, a 5_x_21 bit mux is provided for each of address paths A and B. The arbiter selects addresses for passage on path A only, path B only, or both path A and path B. Addresses are passed along both paths only if the address banks of the addresses are different.

Each address is divided into fields that are individually selectable by the address multiplexer 406 that is part of the high-speed address and data multiplexers 206 (FIG. 2). In the illustrated embodiment, this address multiplexer 406 is a 6_x_11 plus 2_x_2 high-speed address multiplexer. The select input ports of this multiplexer are controlled by the path A timing controller 208 and the path B timing controller 210. The six input signal classes to the illustrated 6_x_11 multiplexer include two each row (ROW) and column (COL) address fields plus two selectable values of "022"h and "400"h. The value of "022"h is the value of the MODE register that is loaded during initialization of an SDRAM. The value of "400"h is the parameter value associated with the "precharge all banks" command, which is also applied to an SDRAM during initialization. Note that in the COL field only an 8 bit field of the address is used. The upper 3 bits are a fixed value of "100"b. This value is a command that initiates the performance of an "auto precharge" operation at the conclusion of the data burst in an SDRAM. In all cases, the selected 11 bits are applied to the address buss input ports of the memory device 102. The 2_x_2 multiplexer passes the selected bank address bits to the bank address input ports of the memory device 102.

Figure 5:
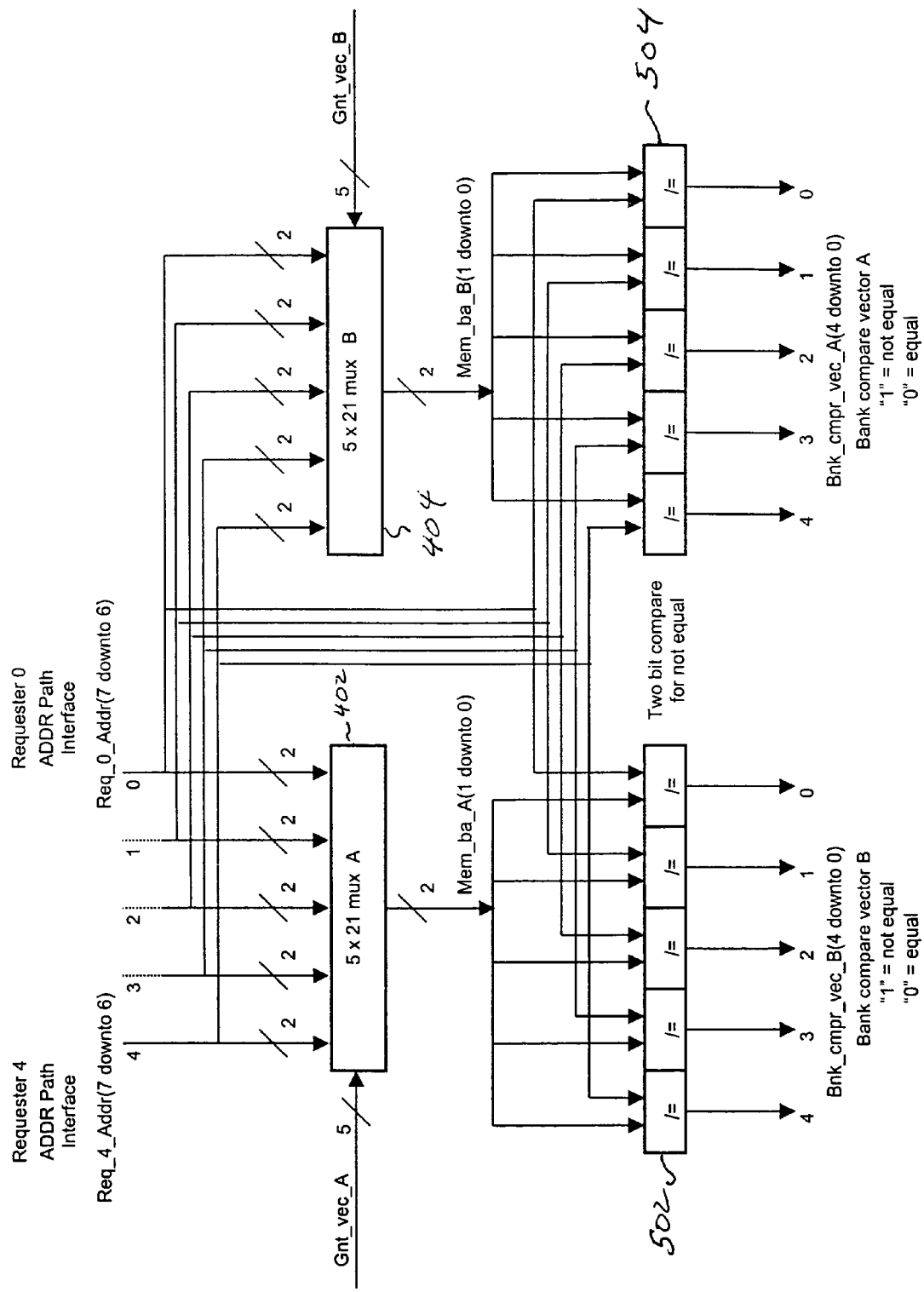
FIG. 5 is a block diagram of exemplary bank address compare logic in accordance with one aspect of the present invention.

FIG. 5 provides additional details of the address path for the two bank address bits (bits 7 and 6). As described above, the path A and B address multiplexers 402 and 404 receive path A and B grant vectors (Gnt_vec_A and Gnt_vec_B), respectively, generated by the arbiter 112 (FIG. 2) for selecting which requester's addresses are passed. The fact that a particular address is selected by the arbiter 112 for processing by the path A controller or the path B controller implies that it is "in use" by that path controller. A first comparator 502 compares a bank address that is "in use" by the path A controller individually to a set of all bank addresses for requests from the requesters and a second comparator 504 compares a bank address that is "in use" by the path B controller individually to a set of all bank addresses for requests from the requesters. The comparators 502 and 504 generate a "1" if the bank addresses are unequal and a "0" otherwise to form bit vectors (Bnk_cmpr_vec_B and Bnk_cmpr_vec_A, respectively) in which each bit indicates whether or not the corresponding applied bank address is equal to the bank address "in use." This arrangement is duplicated for both A and B path controllers because a different bank address is always in use by each of these path controllers. These vectors are used as input signals to the arbiter 112 to determine if a second bank in the SDRAM may be activated. A transaction may only proceed on the path B controller when the path A controller is active if the bank address for the path B controller is not equal to the bank address "in use" by the path A controller. Similarly, a transaction may only proceed on the path A controller when the path B controller is active if the bank address for the path A controller is not equal to the bank address "in use" by the path B controller.

Figure 6:
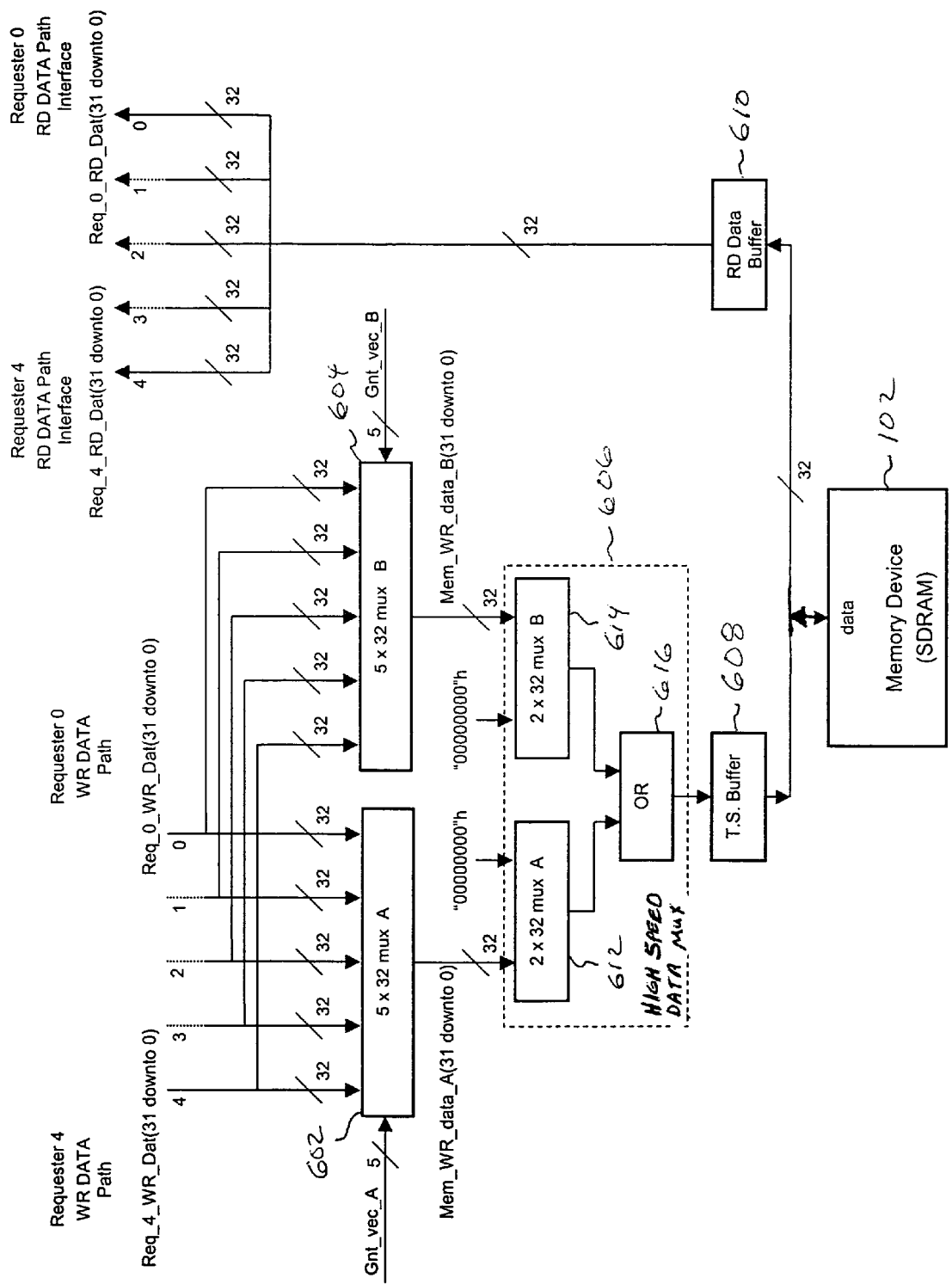
FIG. 6 is a block diagram of exemplary data path components in accordance with one aspect of the present invention.

FIG. 6 provides details of the data path. The illustrated circuitry includes a path A data multiplexer 602, a path B data multiplexer 604, a data portion 606 of the high speed address and data multiplexers 206 (FIG. 2), a three-state (T.S.) buffer 608 and a read data buffer 610. The path A data multiplexer 602 and the path B data multiplexer 604 are each provided with input signals associated with unique requesters. The multiplexers 602 and 604 receive concurrently data from these requesters 100 (FIG. 2) to be written to the memory device 102. In addition, the path A and B data multiplexers 602 and 604 receive path A and B grant vectors (Gnt_vec_A and Gnt_vec_B), respectively. The arbiter 112 (FIG. 2) generates the path A and B grant vectors to select which requester's data is passed. The path A data multiplexer 602 and the path B data multiplexer 604 form part of the path A circuitry 202 (FIG. 2) and the path B circuitry 204 (FIG. 2), respectively. In the illustrated embodiment, a 5_x_32 bit multiplexer is provided for each of data paths A and B. As described above for the passage of the addresses, the arbiter 112 similary selects data for passage on path A only, path B only, or both path A and path B. Data is passed along both paths only if the bank addresses associated with the data are different.

The result of the arbiter selection is forwarded to the data portion 606 of the high-speed address and data multiplexers 206 (FIG. 2) along with a "00000000"h (i.e., 0 hexidecimal) value. The illustrated data portion 606 includes a path A 2_x_32 multiplexer 612 in path A and a path B 2_x_32 multiplexer 614 in path B. These multiplexers 612 and 614 are independently controlled by the path A and B timing controllers 208 and 210, respectively. Each path timing controller defaults to selecting the "00000000"h value for presentation at an output port. This value allows for logical ORing of the data paths by OR gate 616 and also presents a zero pattern if both controllers are idle. After ORing, the data is passed through the three-state (T.S.) buffer 608, which is controlled by the timing controllers, to switch write data on and off the data buss. If either the path A or path B timing controllers is accessing the memory device 102 to write data, the T.S. Buffer 608 will, at a particular time, enable the write data associated with the path A or path B timing controller, respectively, for presentation to the data input/output (I/O) ports of the memory device 102 with the proper timings. Once the path is established, write data is transferred in a burst for four consecutive clock cycles during which four dwords are written to the memory device 102.

Data read from the memory device 102 passes directly to all requesters through the RD data buffer 610. Data is transferred in a four dword burst regardless of the data requested by the requester. Signal dstb_n is directed to the accepting requester by path logic 202 or 204 (FIG. 2) and is used by that requester to strobe the read data across the interface. The requester accepting the four dword burst is able to ignore non-requested data. During read operations the memory device itself drives data onto the data lines. This read data is propagated through the RD data buffer back to all requesters. The purpose of the RD data buffer is to minimize electrical loading on the memory device data lines. The high impedance state (ZZZ) is presented on the data buss when no device is driving this buss.

Figure 7:
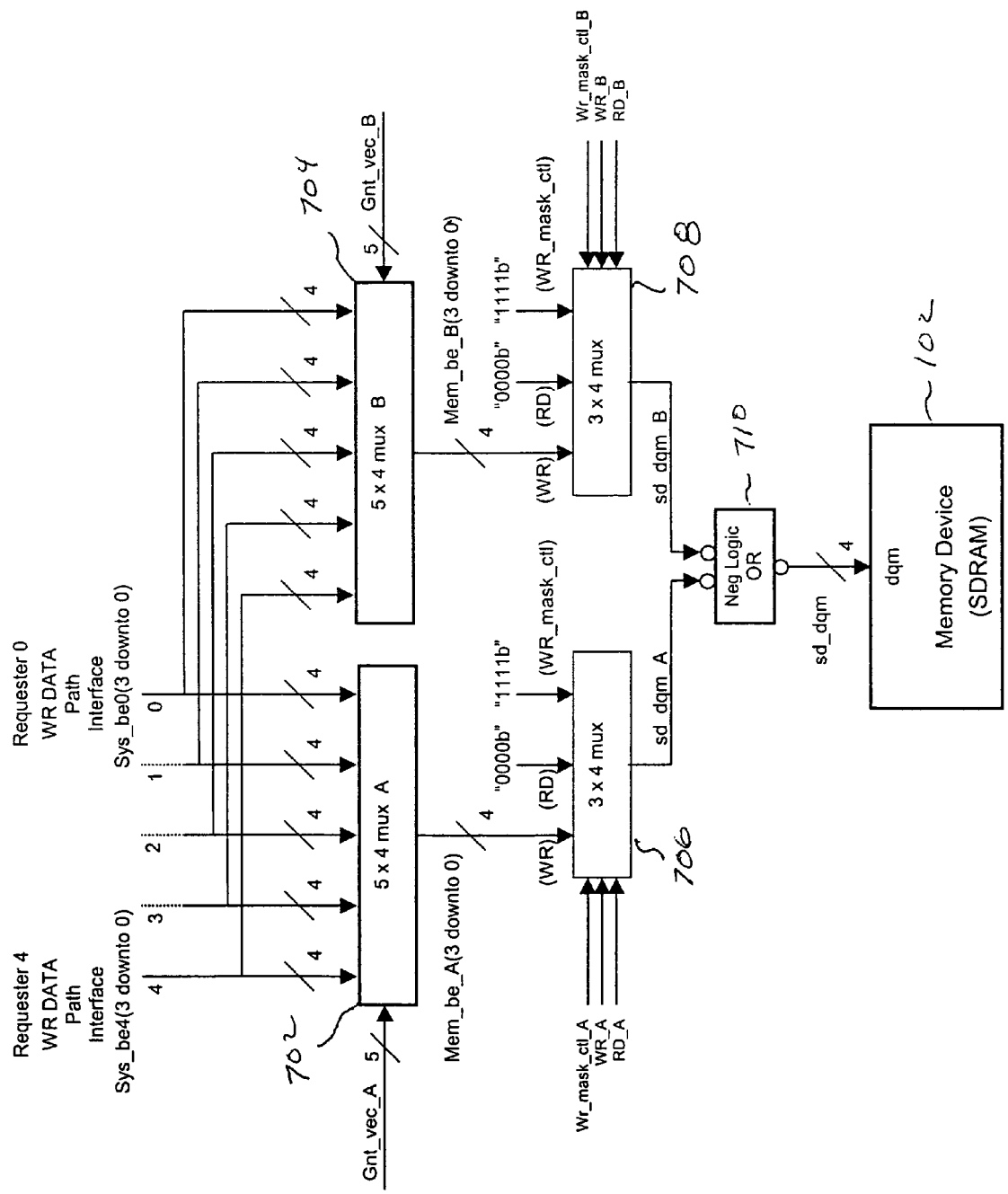
FIG. 7 is a block diagram of exemplary byte enable logic in accordance with one aspect of the present invention.

FIG. 7 provides details of the byte enable (BE) paths. As described above, a set of four BE bits is associated with each byte of the write data dword on the requester interface. The timing of the data and the BE bits are identical. The BE bits are applied to a path A BE multiplexer 702 (5_x_4 mux) and a path B BE mulitplexer 704 (5_x_4 mux). As with the path A and B data multiplexers 602 and 604 (FIG. 6), path A and B grant vectors (Gnt_vec_A and Gnt_vec_B), respectively, generated by the arbiter 112 (FIG. 2) select which requester's BE bits are passed. The operation of the two 5_x_4 multiplexers selecting the BE bits is identical to the selection of the write data dword described in the preceding section. The BE multiplexers 702 and 704 may be considered as an extension appended to each of the data multiplexers 602 and 604 (FIG. 6), respectively.

The result of the arbiter selection via the BE multiplexers 702 and 704 is forwarded to a path A 3_x_4 multiplexer 706 in path A and a path B 3_x_4 multiplexer 708 in path B. These multiplexers 706 and 708 are independently controlled by each of the path A and B timing controllers 208 and 210, respectively. Each multiplexer 706 and 708 receives a "0000"b value (i.e., 0 binary associated with a read) and a "1111"b value (associated with a write) in addition the passed BE bits. Each path controller defaults to selecting the "1111"b value to be provided by the multiplexers 706 and 708. This value defaults to masking all write operations and allows for negative logic ORing of the output signals by a negative logic OR device 710 to produce a positive logic write mask signal (i.e., a dqm signal in an SDRAM) at the memory device 102.

There are three operations a path timing controller 208 or 210 (FIG. 2) can take during an SDRAM memory request cycle. These operations are write, masked write, and read.

If a particular path timing controller 208 or 210 is running an SDRAM write cycle, it will, at the appropriate time, select the BE/ bits associated with that controller (path labeled "WR") for presentation to the dqm input ports of the SDRAM device with the proper timings. For a four dword transaction, write data is transferred in a burst for four consecutive clock periods. The corresponding Wr_mask_ctl_A/B signal is held FALSE for the duration of the four dword burst by the path timing controller. Write operations are controllable down to the individual, independent byte level.

As was previously mentioned, the path timing controllers execute fixed length, four dword write cycles. If fewer than four dwords are desired to be written, a masked write control method is utilized. In a masked write, the first n-of-4 words are written normally as described above and the remaining 4-n words are masked. The masking is accomplished by the requester driving the corresponding Wr_mask_ctl_A/B TRUE during the dstb clock period(s) in which dword masking is desired. In response, the path timing controller selects the "1111"b for presentation at the output ports as sd_dqm_A/B and to be forwarded to the SDRAM dqm input ports. This has the effect of masking all writes for clock periods in which "1111"b is selected. The scope of the Wr_mask_ctl_A/B is a full dword. The write mask control overrides any BE/s that may be present. Data presented by the requester for masked dwords is allowed to be stale or otherwise invalid.

As described above, the path timing controllers execute a fixed length, four dword read cycle as well. If fewer than four dwords are desired to be read, the requester must discard unwanted dwords. If a particular path timing controller is running an SDRAM read cycle, it will, at the appropriate time, select the "0000"b value associated with that controller (path labeled "RD") for presentation to the dqm input ports of the SDRAM device 102 with the proper timings, which enables all four bytes of data corresponding to each of the four dwords. For a four dword transaction, read data is transferred in a burst for four consecutive clock periods.

Referring back to FIG. 2, the arbiter 112 is responsible for establishing data, address, and control paths between a plurality of requesters and the memory device. It does this by executing a fairness arbitration algorithm with all requesters having essentially equal access to memory. In the illustrated embodiment, there are five requesters and two data, address, and control paths available to the arbiter 112. The arbiter determines which of four conditions is controlled at any given time: no paths selected, path A only selected, path B only selected, or both paths A and B selected. These conditions are dynamic and change as requests submitted by the requesters are processed.

The arbiter is also responsible for generating memory requests to each of the path timing controllers, signals Mem_req_A and Mem_req_B, respectively, and is responsible for the generation of write commands to each of the path timing controllers, signals Wr_cmd_A and Wr_cmd_B, respectively.

The arbiter accomplishes its task by executing an arbitration cycle. During each arbitration cycle the arbiter observes all the requests presented by the requesters, which are assigned unique values, and decides which requester is to be granted a memory cycle. It makes this decision based upon a fixed priority scheme taking into account the bank addresses submitted by the requesters and the bank addresses currently being processed by the path controllers. Differing bank addresses permit the execution of dual active bank control. Accordingly, differing bank addresses have priority over identical bank addresses between requesters. This fairness algorithm permits maximum memory bandwidth to be achieved by maximizing the usage of the memory device and the busses. The process continues until all requests present for that arbitration cycle have been serviced. Only one request per requester is recognized during an arbitration cycle. This ensures equal access to the memory by all requesters. A minimum of one grant and a maximum of five grants may occur for each arbitration cycle in this exemplary embodiment. The requester granting sequence can be any order depending upon the memory bank addresses presented by the requesters and the bank address(es) of requests being processed.

The arbiter 112 and the path A and B timing controllers exchange timing signals to ensure proper synchronization of signals. The following is a summary of exemplary signals between the arbiter and the path timing controllers.

Name: Mem_req_A—Memory request A
Direction: from arbiter to the path A timing controller.
Description: Request for the path A timing controller to execute an SDRAM memory cycle. The type of cycle is determined by signal Mem_wr_cmd_A.

Name: Mem_req_B—Memory request B Direction: from arbiter to the path B timing controller.
Description: Request for the path B timing controller to execute an SDRAM memory cycle. The type of cycle is determined by signal Mem_wr_cmd_B.

Name: Mem_wr_cmd_A—Memory write command A
Direction: from arbiter to the path A timing controller.
Description: Command for the path A timing controller to execute an SDRAM write cycle if TRUE, read cycle if FALSE.

Name: Mem_wr_cmd_B—Memory write command B
Direction: from arbiter to the path B timing controller.
Description: Command for the path B timing controller to execute an SDRAM write cycle if TRUE, read cycle if FALSE.

Name: Mem_wr_mask_A—Memory write mask A
Direction: from arbiter to the path A timing controller.
Description: Command for the path A timing controller to mask (or disable) writes of dwords for write burst clock periods for which this signal is TRUE. This signal is directly forwarded from the granted requester through the arbiter to the path A timing controller.

Name: Mem_wr_mask_B—Memory write mask B
Direction: from arbiter to the path B timing controller.
Description: Command for the path B timing controller to mask (or disable) writes of dwords for write burst clock periods for which this signal is TRUE. This signal is directly forwarded from the granted requester through the arbiter to the path B timing controller.

Name: Mem_ack_A—Memory acknowledge A
Direction: from the path A timing controller to the arbiter.
Description: Synchronization signal that is TRUE for the single clock period that the SDRAM "READ" or "WRITE" command is loaded into the memory device by the path A timing controller.

Name: Mem_ack_B—Memory acknowledge B
Direction: from the path B timing controller to the arbiter.
Description: Synchronization signal that is TRUE for the single clock period that the SDRAM "READ" or "WRITE" command is loaded into the SDRAM device by the path B timing controller.

Name: Mem_dstb_A—Memory data strobe A.
Direction: from the path A timing controller to the arbiter.
Description: Synchronization signal that is TRUE coincident with the data during the four consecutive clock periods in which a burst of READ or WRITE data is transferred between the SDRAM device and the path A timing controller. This signal is forwarded by the arbiter to the granted requester and used by the requester to control the transfer of data.

Name: Mem_dstb_B—Memory data strobe B.
Direction: from the path B timing controller to the arbiter.
Description: Synchronization signal that is TRUE coincident with the data during the four consecutive clock periods in which a burst of READ or WRITE data is transferred between the memory device and the path B timing controller. This signal is forwarded by the arbiter to the granted requester and used by the requester to control the transfer of data.

Name: Mem_cyc_cmpl_A—Memory cycle complete A.
Direction: from the path A timing controller to the arbiter.
Description: Synchronization signal that is TRUE for a single clock period coincident with the transfer of the last dword of the four dword burst from the path A timing controller. This signal has two uses. First, the arbiter uses it to disable the granted path and enable a new granted path. Secondly, the arbiter forwards it to the granted requester and the requester presents its next request to the arbiter responsive to the signal, if desired.

Name: Mem_cyc_cmpl_B—Memory cycle complete B.
Direction: from the path B timing controller to the arbiter.
Description: Synchronization signal that is TRUE for a single clock period coincident with the transfer of the last dword of the four dword burst from the path B controller. This signal has two uses. First, the arbiter disables the granted path and enables a new granted path responsive to the signal. Secondly, the arbiter forwards the signal to the granted requester and the requester presents its next request to the arbiter responsive to the signal, if desired.

Figure 8:
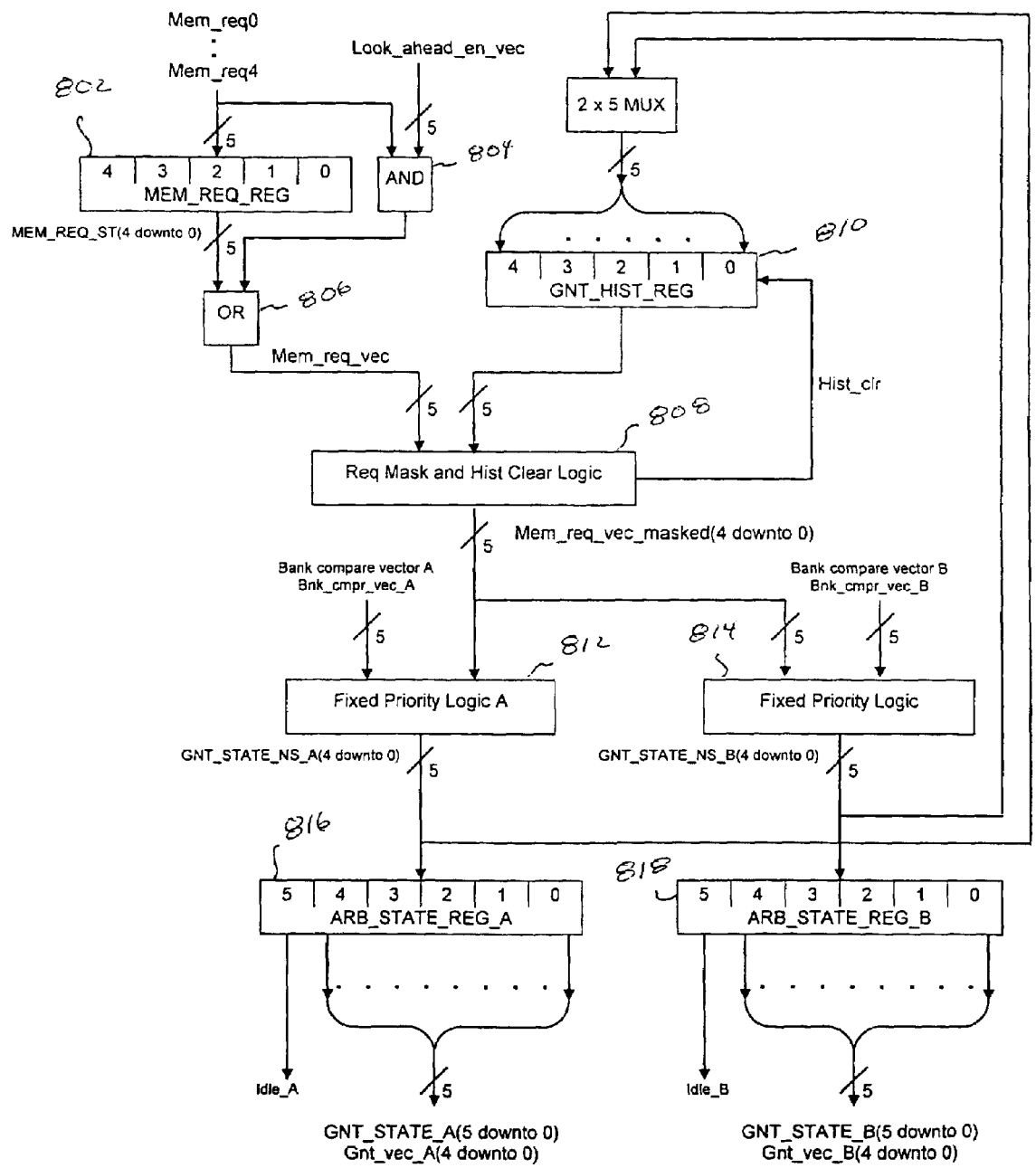
FIG. 8 is a block diagram of exemplary arbiter control logic in accordance with one aspect of the present invention.
Figure 9:
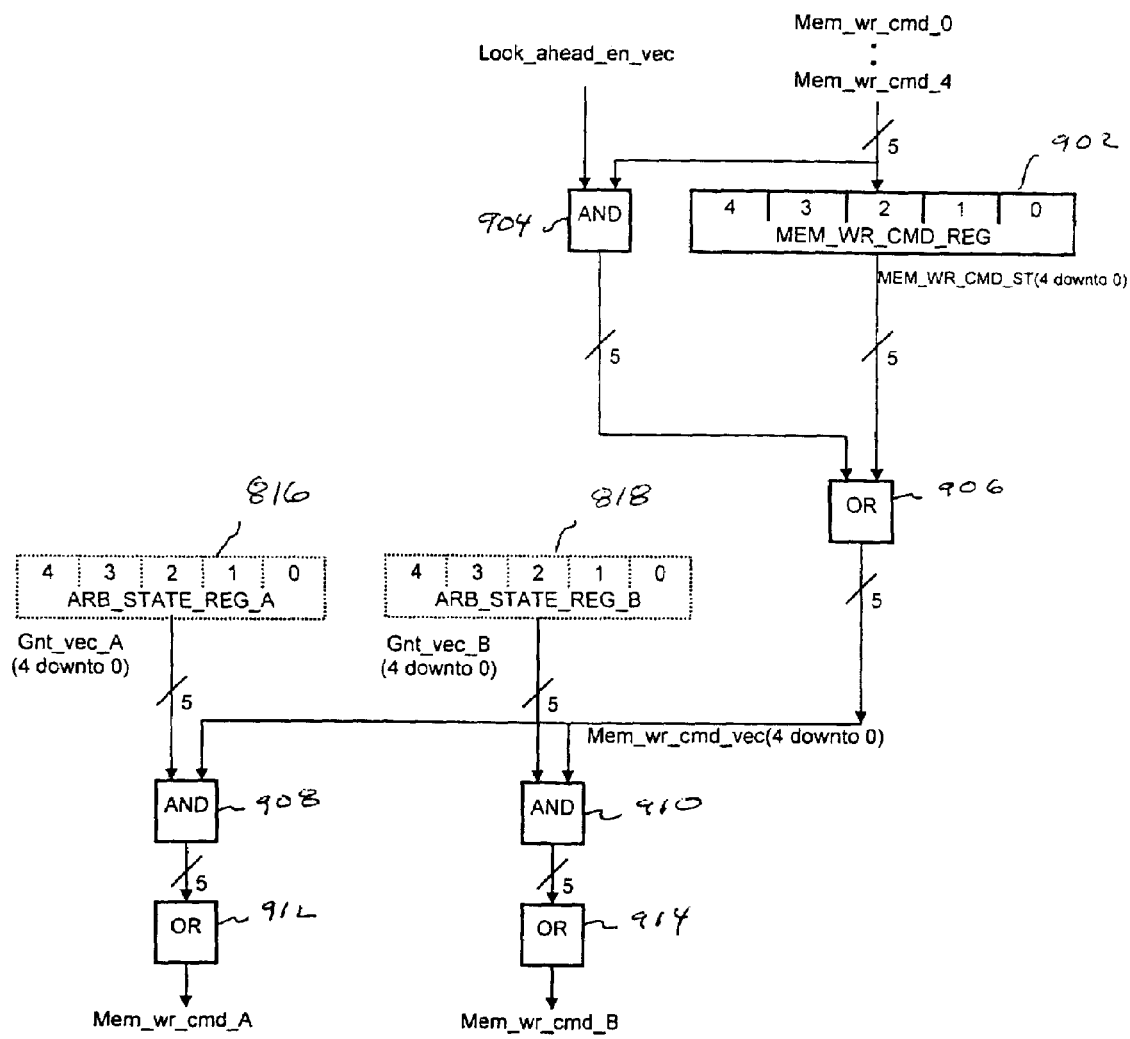
FIG. 9 is a block diagram of exemplary write command logic in accordance with one aspect of the present invention.

FIG. 8 is an illustration of the control logic within the arbiter 112 and FIG. 9 is an illustration of associated write command logic, both in block form. A memory request register (MEM_REQ_REG) 802 in FIG. 8 latches incoming requests. Similarly, a memory write command register (MEM_WR_CMD_REG) 902 in FIG. 9 latches memory write commands. An AND logic gate 804 and an OR logic gate 806 in FIG. 8 and an AND logic gate 904 and an OR logic gate 906 provides bitwise bypass logic around MEM_REQ_REG 802 and MEM_WR_CMD_REG 902, respectively, to save one clock period of latency in the case of an incoming request occurring when everything is idle. A bit vector of requests (Mem_req_vec) from the OR logic gate 806 in FIG. 8 is presented as an input signal to a request mask and history clear logic circuit 808.

A grant history register (GNT_HIST_REG) 810 constructs a bit vector of requesters that have been serviced for a current arbitration cycle. Upon completion of an SDRAM cycle signaled by Gnt_vec_A/B(n) and associated Mem_cyc_cmpl_A/B being true, the corresponding bit in the GNT_HIST_REG 810 is set. The request mask and history clear logic 808 then masks off that request so that it is not serviced a second time during the arbitration cycle. The resultant output signal appears as Mem_req_vec masked. This action proceeds until all outstanding requests have been serviced and are masked off. At this time, the value of Mem_req_vec masked will be "00000"b. Decoding this value generates a history clear signal (Hist_clr) that clears the GNT_HIST_REG 810, which allows a new arbitration cycle to begin.

The vector of masked requests is applied to path A fixed priority logic 812 and path B fixed priority logic 814. In addition, bank compare vector A (Bnk_cmpr_vec_A) from comparator 502 (FIG. 5) is passed to the path A fixed priority logic 812 and bank compare vector B (Bnk_cmpr_vec B)

from comparator 504 is applied to the path B fixed priority logic 814. The bank compare vectors A and B each indicate a "1" in the vector position in which the bank addresses do not match, which indicates whether two memory banks can presently be active concurrently. The bank compare vectors are unique to their corresponding paths and are not interchangeable.

The fixed priority logic 812 and 814 provides an organized way of observing all the input signals to generate a next state for a path A arbitration state register (ARB_STATE_REG_A) 816 and a path B arbitration state register (ARB_STATE_REG_B) 818, respectively. In an exemplary embodiment, the fixed priority logic for a given path compares non-masked memory bank requests from the requesters with the memory bank currently activated for the other path and grants access to the memory bank of the requester having the lowest value that is non-masked and doesn't match the memory bank currently activated for the other path. Because of the way the fixed priority logic is used in this exemplary embodiment, it does not result in a fixed priority arbitration scheme but rather a fairness scheme in which each requester has equal access to the memory device. During an arbitration cycle, a different set of request input signals (due to masking) is presented each time. Thus, the resultant sequence of grants is not in a fixed order. The timings of the state changes are determined by timing signals from corresponding path timing controllers. Thus, the path A timing controller times the state changes in ARB_STATE_REG_A and the path B timing controller times the state changes in ARB_STATE_REG_B.

The ARB_STATE_REG_A and B 816 and 818 contain a one-of-6 decoded vector that indicates which requester (or no requester) is currently serviced by each of the path A and B timing controllers. Other than the idle value, the values of the two vectors are mutually exclusive. The output Gnt_vec_A/B values control path selection for their respective paths. When a bit is set in one of the grant vectors, a Mem_req_A or Mem_req_B signal is sent to the corresponding path timing controller.

Referring to the write command logic in FIG. 9, Mem_wr_cmd_0-4 bits are loaded in the corresponding positions of the MEM_WR_CMD_REG 902 simultaneously with the setting of the memory request register 802. A memory write command vector is formed at the output port of the bitwise OR gate in the same way as the memory request vector previously discussed. This vector is individually bitwise ANDed with the contents of each of the arbitration state registers at a first path AND logic gate 908 and a second path AND logic gate 910, respectively. Since each of the arbitration state registers 816 and 818 has at most one true bit, there will be at most one true bit at each output port of the bitwise AND gates 908 and 910. The output signals of the bitwise ANDs 908 and 910 are collectively ORed by a path A multi-input OR logic gate 912 and a path B multi-input OR logic gate 914, respectively, and the resultant signal is presented to the corresponding path timing controller as a memory write command (Mem_wr_cmd_A and B). This signal is coincident with the Mem_req_A or B signal also presented to the path timing controller.

Figure 10A:
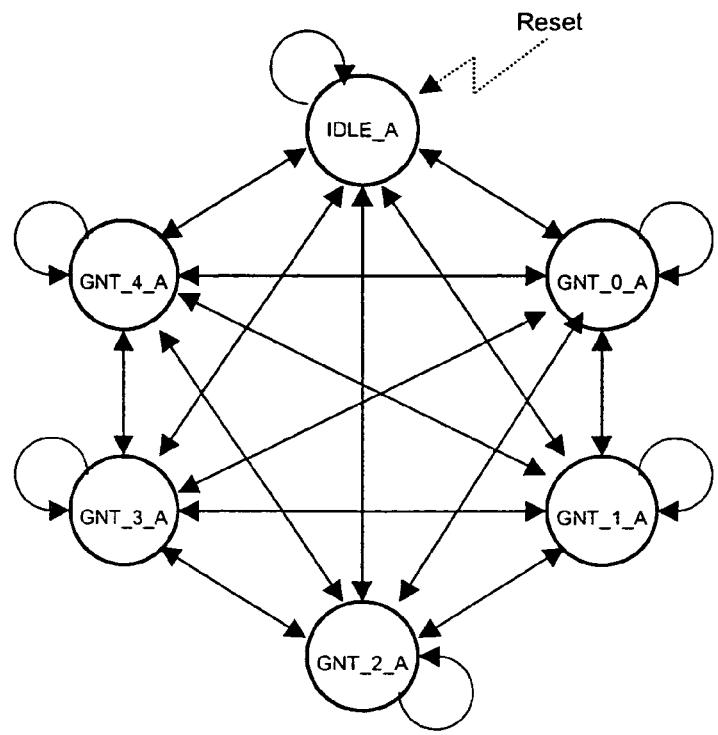
FIGS. 10A and 10B are state diagrams for a path A selection controller and a path B selection controller, respectively, in accordance with one aspect of the present invention.
Figure 10B:
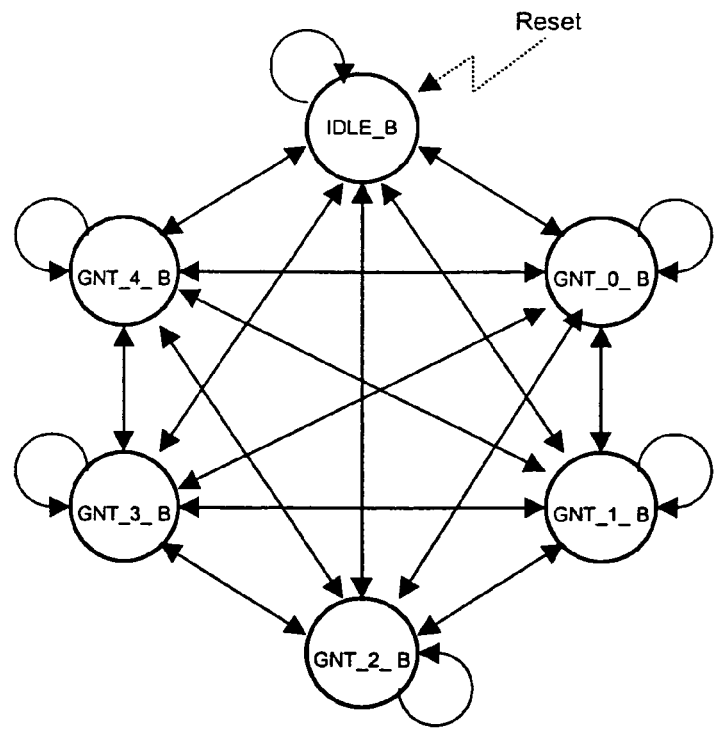

FIGS. 10A and 10B illustrate the states of the arbitration state registers 816 and 818, respectively. In the exemplary embodiment there are six states for each register, one each representing the granting of each requester plus an idle state. Each state is encoded as a single bit in a field of zeroes including the idle state. States representing the grant of a particular requester are identified by the associated requester number. Thus, GNT_2_A grants requester 2 service by the path A controller. Bits 0 through 4 in the exemplary embodiment form a grant vector for each of the requesters. The idle bit is bit 5 of ARB_STATE_REGs_A/B 816 and 818, respectively. As seen in the diagrams, any state can transition to any other state depending upon the requests that are present and their associated bank address bits. There is the constraint that the state values in the two registers are mutually exclusive with the exception of the idle state. That is, both cannot grant the same requester. In an exemplary embodiment, the state transition for any particular arbitration cycle is well-controlled and deterministic (i.e., not arbitrary as the diagram may suggest). However, the aggregate of all possible sequences results in the diagram as shown.

Figure 11:
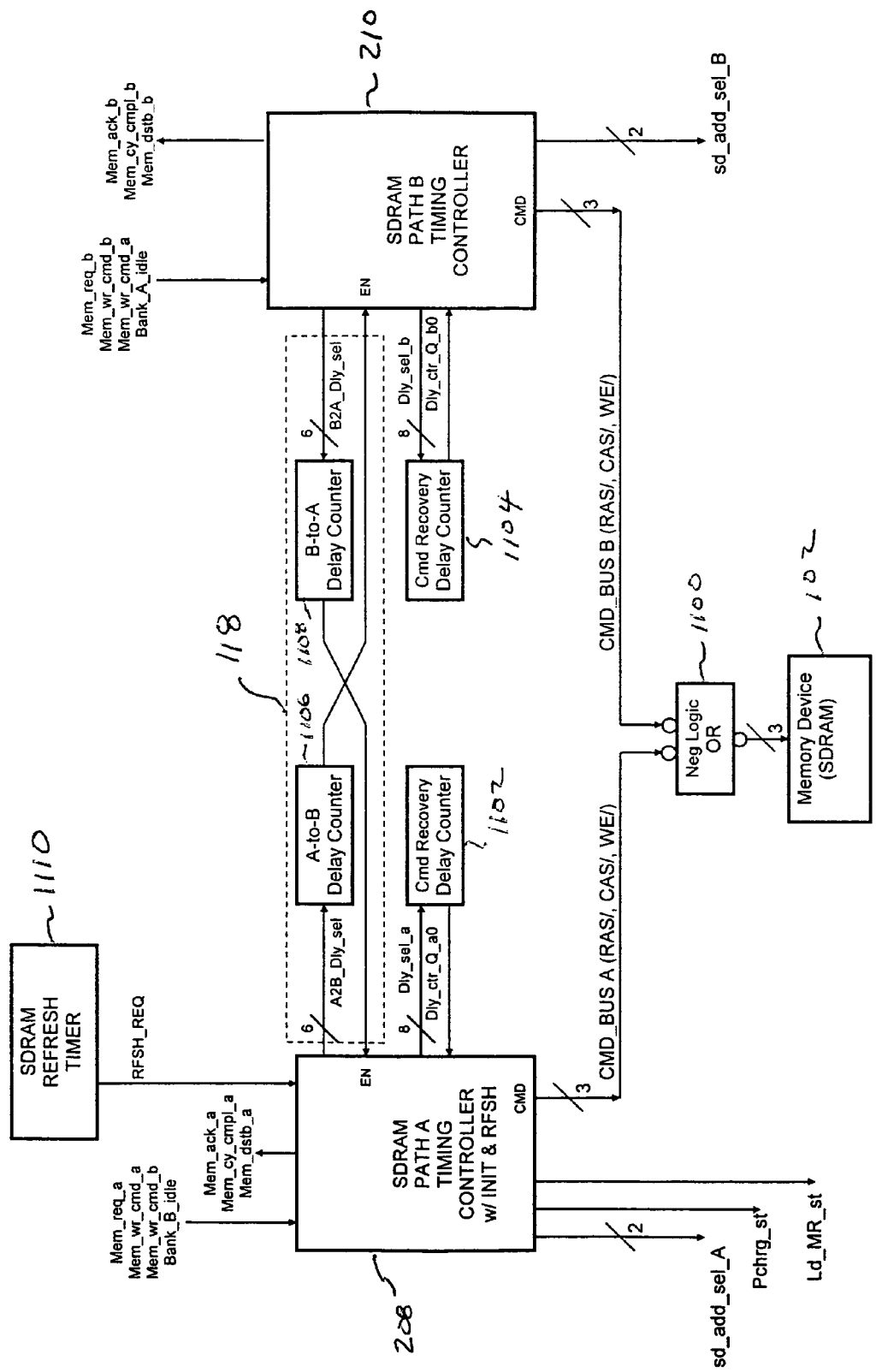
FIG. 11 is a block diagram of a path A timing controller, a path B timing controller, and synchronization logic therefor in accordance with one aspect of the present invention.

FIG. 11 depicts the path A and B timing controllers 208 and 210 along with synchronizer circuitry 118 therefor. It will be readily apparent that circuitry used for synchronization may be implemented primarily within the path timing controllers, within the synchronizer 118, or in a combination of the path timing controllers and synchronizer 118 as illustrated and described herein. The path A and B timing controllers 208 and 210 are responsible for executing read and write burst command sequences compatible with the memory device. In addition, the path A timing controller 208 is responsible for performing the initialization sequence to initialize the memory device and execute periodic row refresh cycles as required by the memory device.

In an exemplary embodiment, the arbiter selects address and data for presentation to the high-speed address and data multiplexers 206 (FIG. 2). Thus, the output signals of the path timing controllers 208 and 210 control only the high-speed logic portion of the data and address paths in order to execute memory device burst read or write cycles. The output signals also directly supply the memory device command signals, e.g., WE/, RAS/ and CAS/, through a bitwise negative logic OR device 1100.

The path A timing controller 208 is coupled to a command recovery delay counter A 1102 and the path B timing controller 210 is coupled to a command recovery delay counter B 1104. The delay counters 1102 and 1104 insert delays for command recovery in the memory device 102 (FIG. 2). The delay counters 1102 and 1104 are each programmable by their respective path timing controllers so that different values of delay may be invoked for different commands. The delay counters are programmed in one state and then used to create a delay in a following state. For example, PRCHG_A state 1206 sets the counter 1102 to a delay of four clock periods. State TRP_A 1207 then holds for a duration of four clock periods to allow for precharge recovery.

In addition, each path timing controller is coupled to a A-to-B delay counter 1106 and a B-to-A delay counter 1108. The A-to-B delay counter 1106 and B-to-A delay counter 1108 are used to insert delays referenced from a fixed point in the sequence of each controller to the start of a memory cycle by the other path timing controller. These counters essentially mask off the incoming Mem_req_A or B until the timing synchronization is such that the second controller may begin a cycle. The A-to-B delay counter 1106 is programmed by the path A timing controller and causes a delay in the path B timing controller. Similarly, the B-to-A delay counter 1108 is programmed by the path B timing controller and causes a delay in the path A timing controller. In an exemplary embodiment, the counters are symmetrical because the same timing relationships are used for both timing controllers. Each counter is programmable by its respective timing controller so that different values of delay may be invoked as required. In an exemplary embodiment, the A-to-B and B-to-A delay counters 1106 and 1108 are serial shift registers. To program the counter, a "1" is injected into one of the upper stages of the shift register. Thereafter, the "1" is shifted to the next lower bit position on each clock pulse. The bit 0 position is implemented to hold the "1". Thus, a "1" in bit 0 position indicates the timer has expired.

The following are the timing delays used for exemplary commands on one path timing controller followed by commands on the other path timing controller: READ->READ, 4 clock periods; WRITE->READ, 3 clock periods, WRITE->WRITE, 4 clock periods, READ->WRITE, 7 clock periods. Thus, the ACTIVATE ROW command from one path timing controller is followed by an ACTIVATE ROW issued by the other path timing controller after the indicated number of clock periods. The path timing controller that is programming the counter sets it for the worst case timing. Thus, if it is doing a WRITE cycle, it programs the delay for 4 clock periods and if it is doing a READ cycle, it programs the delay for 7 clock periods. The path timing controller observing the counter may select a delay less than the worst case, if that applies, by observing the "1" in a higher bit position than bit 0. Thus, if the path B timing controller is doing a READ cycle, it will program the counter for a delay of 7 clock periods. If the path A timing controller then follows with another READ cycle, it will select a shorter delay of 4 clock periods rather than waiting for the full 7 clock period delay by observing bits 3, 2, 1, and 0 of the timer.

The path A timing controller additionally has an external refresh timer 1110. The timer 1110 generates a periodic refresh request signal to the path A timing controller with an exemplary period of approximately 15 microseconds, which is typical for memory devices such as SDRAMs. The request has highest priority and masks off all incoming requests until the completion of current activity by both path timing controllers. The path A timing controller then runs a row refresh cycle. Read and write burst operations resume upon completion of the refresh cycle.

Figure 12:
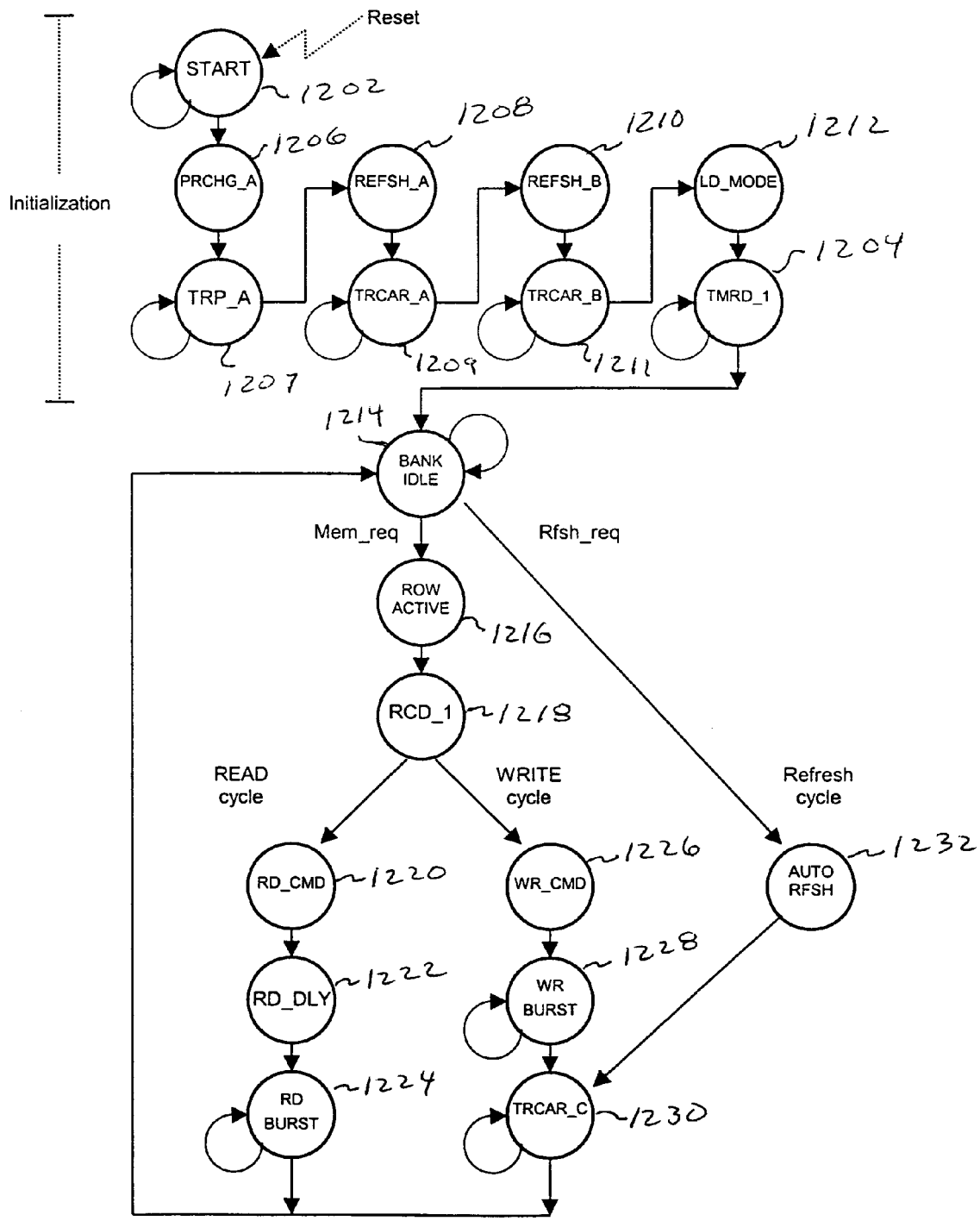
FIG. 12 is a state diagram of an exemplary path A SDRAM timing cycle controller in accordance with one aspect of the present invention.

FIG. 12 illustrates state sequences for the path A timing controller. There is a lead-in sequence of nine states beginning with a START state 1202 and ending with a TMRD_1 state 1204. This sequence performs conventional SDRAM memory device initialization. The path A timing controller then proceeds to the all banks idle (BANK IDLE) state 1214 and awaits a Mem_req_A signal or a refresh request.

The following paragraphs provide a brief description of each of the states of the path A timing controller 208. If no command is identified in the description, the controller provides a NOP (no operation) instruction. As described above, a NOP from one path timing controller can be negative logic ORed with a command (CMD) from the other path timing controller and the resultant command will be the command (CMD) from the other path timing controller. If no values are specified for the address or bank address, the value of "000"h and "00"b are applied, respectively. If no values are specified for the SDRAM data bus, a three-state high-impedance condition is applied, i.e., ZZZ. All states are for a duration of a single clock period unless a delay or clock count is otherwise specified.

The START state 1202 is unconditionally entered whenever a hardware reset signal occurs. The controller stays in this state until reset is released and then transitions to a PRCHG_A state 1206.

This PRCHG_A state 1206 performs a precharge of all banks as part of memory device initialization. The path timing controller issues a precharge command on the command buss and selects the value of "400"h (address bit ten equal to "1") for the address in the address portion of the high-speed address multiplexer 406 as shown in FIG. 4 for presentation at the memory device address input ports. An address bit 10 equal to "1" commands the memory device to do an "all banks" precharge. This state also loads a value of four in the recovery delay counter and then transitions to a TRP_A state 1207.

The TRP_A state 1207 is used to wait for the recovery delay time after the precharge command. This state waits for the recovery delay counter to expire and then transitions to a RFSH_A state 1208.

The RFSH_A state 1208 performs the first of two refresh operations as part of memory device initialization. The controller issues the first auto refresh (REFSH_A) command on the command buss and also loads a value of eight in the recovery delay counter. It then transitions to a TRCAR_A state 1209.

The TRCAR_A state 1209 is used to wait for the recovery delay time after the auto refresh command. This state waits for the recovery delay counter to expire and then transitions to a RFSH_B state 1210.

The RFSH_B state 1210 performs the second of two refresh operations as part of memory device initialization. The path timing controller issues the second auto refresh (REFSH_B) command on the command buss and also loads a value of eight in the recovery delay counter. It then transitions to a TRCAR_B state 1211.

The TRCAR_B state 1211 is used to wait for recovery delay time after the auto refresh command. This state waits for the recovery delay counter to expire and then transitions to a LD_MODE state 1212.

The LD_MODE state 1212 performs a load of an operating mode value into the memory device mode register associated with memory devices such as SDRAM devices. The path timing controller issues a load mode command on the command buss and selects the value of "022"h for the memory device address as the mode value in the address portion 406 of the high speed data and address multiplexer 206 as shown in FIGS. 2 and 4. The "022"h selects a fixed burst length of 4, burst type of "sequential" (non-interleaved), and a CAS latency of two clock periods. This state also loads a value of four in the recovery delay counter and then transitions to the TMRD_1 state 1204.

The TMRD_1 state 1204 is used to wait for the recovery delay time after the load mode command. This state waits for the recovery delay counter to expire and then transitions to BANK IDLE state 1214.

The BANK_IDLE state 1214 is the "parking" state for the path timing controller during periods of inactivity. It is also the decision making state for what cycle will be executed next and when it will begin. Referring to FIG. 11, and focusing on the input signals to the path A timing controller, note that in addition to having its own Mem_req_A and Mem_wr_cmd_A as input signals, it also has Mem_wr_cmd_B and Bank_B_idle as input signals. Thus, the path A timing controller has knowledge of the activity in the path B timing controller.

The highest priority action is to process a refresh request. If a refresh request is present, the path A timing controller waits for the path B timing controller to go idle. At that time a refresh sequence is initiated by transitioning to a AUTO_RFSH state 1232.

The lowest priority action is to process a memory request forwarded by the arbiter. Because the arbiter has forwarded a request, it has already passed the banks-not-equal test or else the path B timing controller is idle and there is no need for a banks test. A check for synchronization with the path B timing controller is needed. This is done by observing the Mem_wr_cmd_B and Bank_B_idle signals and also the value of the B-to-A delay counter. If Bank_B_idle is TRUE, the cycle may begin immediately. If the path B timing controller is not idle, the command sequence (READ-READ, READ-WRITE, etc.) is observed in order to determine the appropriate delay to provide. If the path B timing controller executes a READ operation, it programs the B-to-A delay counter with a delay of seven. If the path B timing controller executes a WRITE operation, it programs the B-to-A delay counter with a delay of four. These represent the maximum worst case required delays in each case.

There are four possible cases that may be present: READ_B->READ_A, READ_B->WRITE_A, WRITE_B->READ_A, WRITE_B->WRITE_A. These conditions are signaled by the values of signals Mem_wr_cmd_A and Mem_wr_cmd_B, both of which are available to the path A timing controller.

In the READ_B->READ_A case, the path B timing controller has a READ operation in progress and the path A timing controller is requested to also do a READ operation. The path B timing controller has programmed a delay value of seven into the B-to-A delay counter. However, the actual optimum delay is only four clock periods for this case. This is accomplished by observing bits of higher order than zero of the B-to-A delay counter. For each higher order bit position observed, the delay is reduced by one clock period. Therefore, bits three down to zero are observed as a unit and logically ORed to indicate expiration of the timer. Thus, the delay is reduced from the worst case seven clock periods to the optimum four clock period delay.

In the READ_B->WRITE_A case, the path B timing controller has a READ operation in progress and the path A timing controller is requested to do a WRITE operation. The path B timing controller has programmed a delay value of seven into the B-to-A delay counter. This is also the optimum delay for this case. Thus, only bit zero of the B-to-A delay counter is observed to indicate expiration of the timer.

In the WRITE_B->READ_A case, the path B timing controller has a WRITE operation in progress and the path A timing controller is requested to do a READ operation. The path B timing controller has programmed a delay value of four clock periods into the B-to-A delay counter. However, the actual optimum delay is only three clock periods for this case. Again this is accomplished by observing bits of higher order than 0 of the B-to-A delay counter. Since the delay is only reduced by one clock period, both bits 1 and 0 are observed as a unit and logically ORed to indicate expiration of the timer, thus reducing the delay from the worst case four clock periods to the optimum three clock period delay.

In the WRITE_B->WRITE_A case, the path B timing controller has a WRITE in progress and the path A timing controller is requested to do a WRITE. The path B timing controller has programmed a delay value of four clock periods into the B-to-A delay counter. This is also the optimum delay for this case. Thus, only bit zero of the B-to-A delay counter is observed to indicate expiration of the timer.

A ROW_ACTIVATE state 1216 performs the required actions to activate a selected row within a selected bank of the memory device. The timing controller issues a ROW ACTIVATE command and applies it to the command buss. The timing controller also selects Mem_addr_A (bits 22 down to 12) as presented to the ROW_A input ports of the address portion of the high-speed address multiplexer 406 for presentation to the address input ports of the memory device (see FIG. 4). It also selects Mem_addr_A (bits 7 and 6) as presented to the ba_A input ports of the high-speed address multiplexer for presentation to the bank address input ports of the memory device. It then transitions to a RCD_1 state 1218.

The RCD_1 state 1218 provides a single clock period of delay between the ROW_ACTIVATE command and READ or WRITE command. It then transitions to a RD_CMD state 1220 or a WR_CMD state 1226 depending upon the value of the Mem_wr_cmd_A signal.

The RD_CMD state 1220 performs the actions to issue a read command from the selected column within the previously activated row and bank of the memory device. The controller issues a READ command applied to the command bus. The timing controller also selects Mem_addr_A (bits 11 down to 8 plus bits 5 down to 2) as presented to the COL_A input ports of the address portion of the high-speed address and data multiplexer 406 for presentation to the address input ports of the SDRAM device (see FIG. 4). The upper three bits of the COL_A input ports are "100"b which commands an auto precharge at the completion of the READ burst. It also again selects Mem_addr_A (bits 7 and 6) as presented to the ba_A input ports of the high-speed address and data multiplexers for presentation to the bank address input ports of the SDRAM device. It then transitions to a RD_DLY state 1222.

The RD_DLY state 1222 provides a single clock period of delay required between the READ command and the first dword of read data. It also programs the command recovery delay counter for a delay of four clock periods for the four clock period read data burst. It then transitions to a RD_BURST state 1224.

The RD_BURST state 1224 fetches a burst of four dwords of read data during four consecutive clock periods. The command recovery delay counter is used to count the clock periods. The signal Mem_dstb_A is generated during each of the four clock periods. This signal is routed back to the granted requester by the arbiter and is used by the requester to load the four dwords of read data. On the final clock period of the burst, the signal Mem_cyc_cmpl_A is generated back to the requester coincident with the last read data dword. It then transitions back to the BANK_IDLE state 1214.

The WR_CMD state 1226 performs the required actions to issue a write to the selected column within the previously activated row and bank of the SDRAM device. The path timing controller issues a WRITE command applied to the command buss. The path timing controller also selects Mem_addr_A (bits 11 down to 8 plus bits 5 down to 2) as presented to the COL_A input ports of the address portion of the high speed address and data multiplexers 406 for presentation to the address input ports of the memory device (see FIG. 4). The upper 3 bits of the COL_A input ports are "100"b which commands an auto precharge at the completion of the write burst. The path timing controller again selects Mem_addr_A (bits 7 and 6) as presented to the ba_A input ports of the high-speed address and data multiplexer for presentation to the bank address input ports of the memory device 102 (FIG. 2). The first dword of write data, Mem_WR_data_A (bits 31 down to 0), is selected by the data portion 606 of the high speed address and data multiplexers 206 and the three-state buffer 608 is driven to a low impedance mode to drive the data onto the memory device data input ports. (see FIG. 6) The signal Mem_dstb_A is generated for the first of four consecutive clock periods. This signal is routed back to the granted requester by the arbiter and is used by the requester to present the first of four dwords of write data on the write data interface of the requester. The timing controller also programs the command recovery delay counter for a delay of three clock periods for the remaining three clock periods of the write data burst. It then transitions to a WR_BURST state 1228.

The WR_BURST state 1228 performs a burst of the remaining three dwords of write data on three consecutive clock periods. The command recovery delay counter is used to count the clock periods. The signal Mem_dstb_A is generated on each of the three clock periods. This signal is routed back to the granted requester by the arbiter and for use by the requester to present the remaining three dwords of write data on the requester interface. The same data path selection and low impedance buffer mode set up in WR_CMD remain in effect for the duration of WR_BURST. On the final clock period of the burst, the signal Mem_cyc_cmpl_A is generated back to the granted requester coincident with the last write data dword. Also on the final clock period, the path controller programs the command recovery delay counter for a delay of one clock period for write recovery delay. It then transitions to a TRCAR_C state 1230.

The TRCAR_C state 1230 is used to wait for the recovery delay time. In this state the three-state buffer 608 is configured in a high impedance (disabled) mode. This state is shared by both the WR_BURST state 1228 and AUTO_RFSH state 1232. A different delay value is programmed by each of those states. This TRCAR_C state waits for the recovery delay counter to expire, thus providing the programmed recovery time, and then transitions back to the BANK_IDLE state 1214.

The AUTO_RFSH state 1232 performs the periodic refresh as requested by the refresh timer 1110 of FIG. 11. The path timing controller issues an AUTO REFRESH command on the command buss and also loads a value of seven in the recovery delay counter. It then transitions to the TRCAR_C state 1230.

Figure 13:
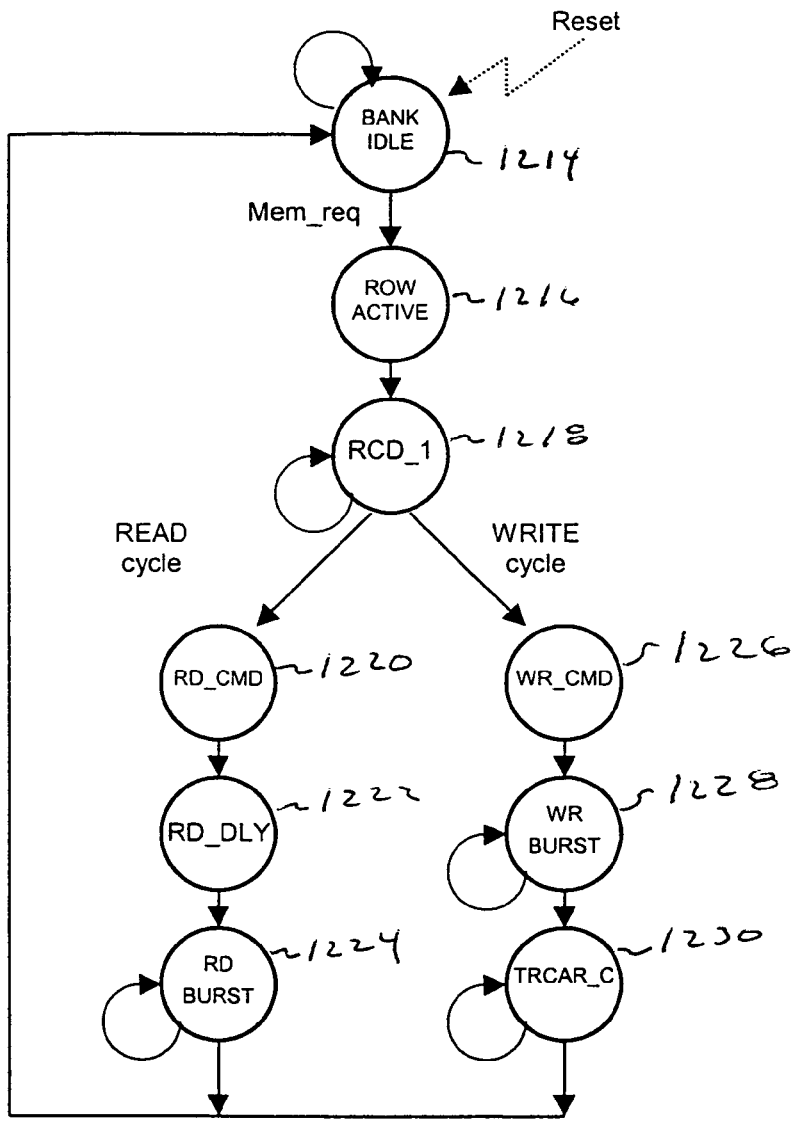
FIG. 13 is a state diagram of an exemplary path B SDRAM timing cycle controller in accordance with one aspect of the present invention.

FIG. 13 illustrates the state sequence for the path B timing controller. The same discussion as for the path A timing controller applies, excluding the discussion on the initialization and refresh sequences. Also, the discussion is complementary in the sense that "A" and "B" must be exchanged. Similar states, although identically numbered and described, physically exist in hardware separate and independent of the path A timing controller.

Figure 14:
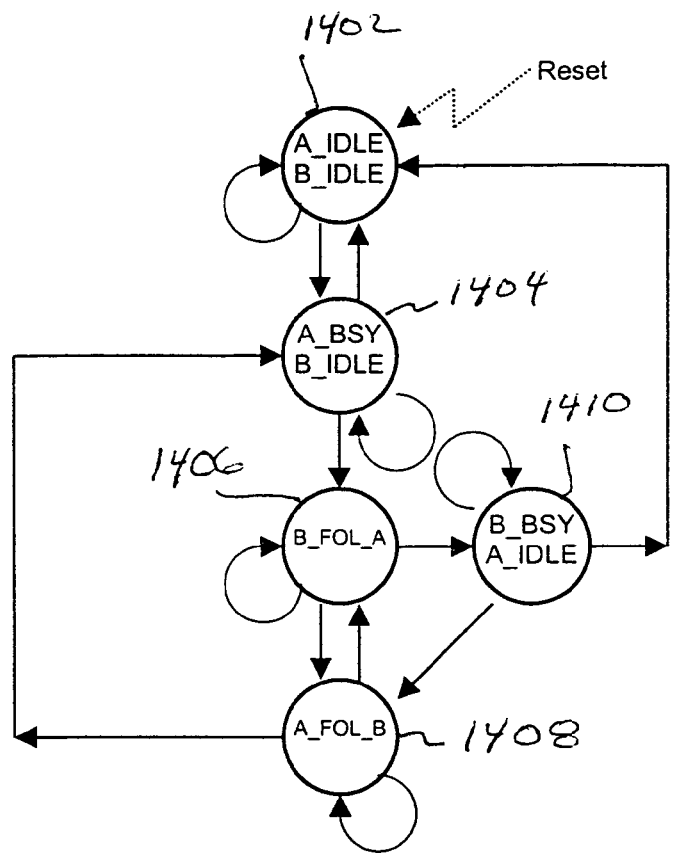
FIG. 14 is a state diagram of the interaction between an exemplary path A SDRAM timing cycle controller and an exemplary path B SDRAM timing cycle controller in accordance with one aspect of the present invention.

FIG. 14 depicts the interaction between path A and B timing controllers. Each of the controllers is considered idle when it is in the BANK_IDLE state. Otherwise, it is considered busy. Control remains in the states B_FOL_A, A_FOL_B, (A-BSY, B_IDLE), and (B_BSY, A_IDLE), described in detail below, for a maximum of approximately ½ of an SDRAM cycle since all of these states represents overlap of a controller A memory cycle with a controller B memory cycle and this condition changes approximately every ½ SDRAM cycle. These states are conceptual states representing partially overlapping sequences of the states of the above-described path A and B timing controllers. The individual states are now described.

A_IDLE, B_IDLE state 1402—both controllers are in the BANK_IDLE state.

A_BSY, B_IDLE state 1404—the path A timing controller has accepted a request and has begun executing a memory cycle to the memory device and the path B timing controller remains in the BANK_IDLE state. If the arbiter forwards a request to the path B timing controller to perform a parallel memory cycle, the transition to B_FOL_A is taken. If not, the path A timing controller completes its cycle and control transitions back to the (A_IDLE, B_IDLE) state. This is the state for initialization and auto refresh in which case the path B timing controller is idle.

B_FOL_A state 1406 ("B" following "A")—the path A timing controller has accepted a request and is busy executing a memory cycle to the memory device and the arbiter has forwarded a request to the path B timing controller to perform a parallel memory cycle and B has gone busy executing a parallel memory cycle. The B cycle is pipelined approximately one-half a memory cycle behind the A cycle. If, upon A completing its cycle, the arbiter forwards another request to the path A timing controller to perform a parallel memory cycle, the transition to A_FOL_B is taken. If not, the control transitions back to the (B_BSY, A_IDLE) state when the path A timing controller completes its cycle.

A_FOL_B state 1408 ("A" following "B")—the path A timing controller has completed its cycle while B is busy executing a memory cycle to the SDRAM device and the arbiter has forwarded another request to the path A timing controller to perform a parallel memory cycle and it is busy executing a parallel memory cycle. The A cycle is pipelined approximately one-half a memory cycle behind the B cycle. If, upon B completing its cycle, the arbiter forwards another request to the path B timing controller to perform a parallel memory cycle, the transition to B_FOL_A is taken. If not, the control transitions back to the (A_BSY, B_IDLE) state when the path B timing controller completes its cycle.

B_BSY, A_IDLE state 1410—the path A timing controller has completed its cycle and enters the BANK_IDLE state while B is busy executing the second half of a memory cycle to the SDRAM device and the arbiter has not forwarded another request to the path A timing controller to perform a parallel memory cycle so it stays idle. The most probable action is that the path B timing controller completes its cycle, goes to BANK_IDLE, and control transitions back to the (A_IDLE, B_IDLE) state. However, it is possible that an unserviced requester issues a request late in the cycle that is forwarded by the arbiter to the path A timing controller to perform a parallel memory cycle in which case the transition to A_FOL_B is taken.

Figure 15A:
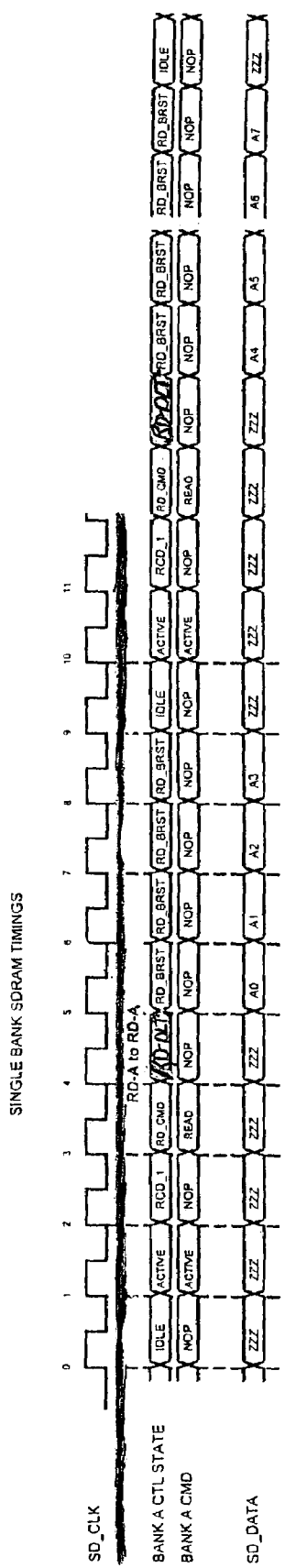
FIGS. 15A and 15B are timing diagrams illustrating the timing for a pair of read commands and a pair of write commands, respectively, performed by a single path timing controller in accordance with one aspect of the present invention.
Figure 15D:
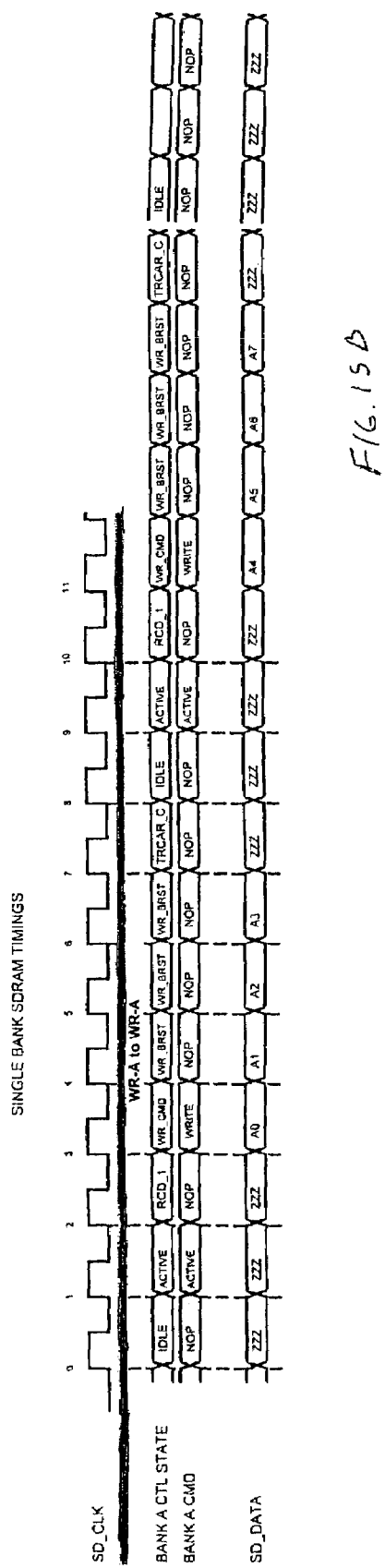

FIGS. 15A and 15B depict timing diagrams for memory requests performed by a single controller, e.g., the path A timing controller. The timing diagrams in FIGS. 15A and 15B are analogous to the timing necessary for conventional systems in which solely a single controller is employed. FIG. 15A depicts two read requests for reading data from a memory device. At clock period 0, the path A timing controller is in an idle state with a no operation command being presented by the path A timing controller 208 to the memory device 102 (FIG. 2) and high impedance (represented by "ZZZ") supplied to the data buss. At clock period 1, the path A timing controller is in an active state and issues an active command to the memory device after receiving a memory request. A single clock period delay is then supplied by RCD_1 at clock period 2. At clock period 3, the path A timing controller is in a read command state, which causes the path A timing controller to issue a read command to the memory device. After the read command is issued, one clock cycle of delay passes before the memory device places data on the data buss. At clock period 5, the memory device places data on the data buss while the path A timing controller goes into a RD_BRST state during four clock cycles while the data is being transmitted, e.g., four dwords with each dword corresponding to a single clock period. After the four clock cycles of data are placed on the data buss, the controller is ready to perform another read command. As can be seen from FIG. 15A, five clock periods are used to set up the system to pass another four dwords. During this set up period, the data buss remains inactive.

FIG. 15B depicts two write requests for writing data to a memory device. At clock period 0, the path A timing controller is in an idle state with a no operation command being presented by the path A timing controller to memory device 102 and no data supplied to the data buss. At clock period 1, the path A timing controller is in an active state and issues an active command to the memory device after receiving a memory request. A single clock period delay is then supplied by RCD_1 at clock period 2. At clock period 3, the path A timing controller is in a write command state, which causes the path A timing controller to issue a write command to the memory device and the first dword of data to be placed on the data buss for transfer to the memory device. This is different than for the read command in which the data from the memory device is not placed on the data buss for two clock cycles after the read request. The remaining three words of the write data burst are then supplied during successive clock periods while the path A timing controller is in a write burst state. After all data is placed on the data buss, the system is ready to perform another write command. As can be seen from FIG. 15B, four clock periods are used to set up the system to pass another four dwords. During this set up period, the data buss remains inactive.

FIGS. 16A-D depict exemplary timing diagrams for memory requests performed by two path timing controllers. In each of the exemplary timing diagrams path B timing controller follows behind path A timing controller. This is analogous to the B_FOL_A state 1404 (FIG. 14). Interchanging the roles of the path A timing controller and the path B timing controller is also within the scope of the present invention which is analogous to the A_FOL_B state 1408 (FIG. 14).

Figure 16H:
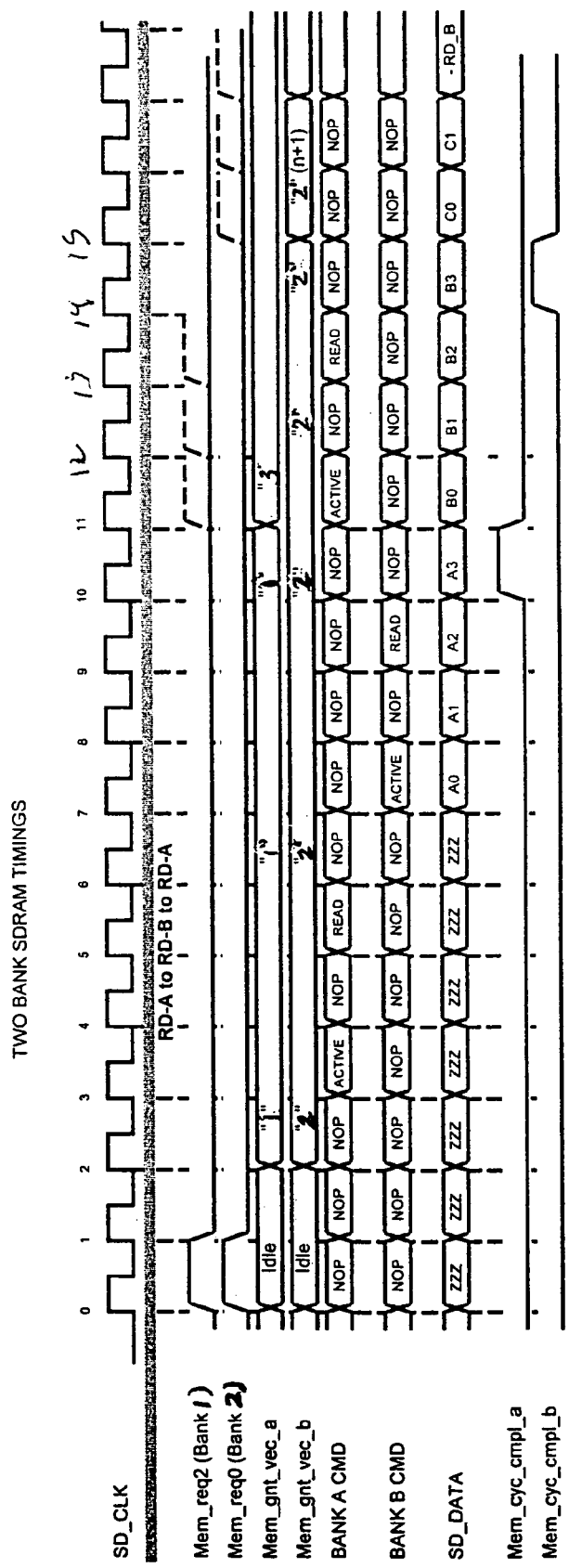
FIGS. 16A, 16B, 16C, and 16D are timing diagrams illustrating the timing for a pair of read commands, a read command followed by a write command, a write command followed by a read command, and a pair of write commands, respectively, performed by a dual path timing controller in accordance with one aspect of the present invention.

FIG. 16A depicts the timing for two read requests received substantially simultaneously. At clock period 0, a first requester (requester 2) requests to read data from a first memory bank and a second requester (requester 0) requests to read data from a second memory bank. At clock period 2, an arbiter assigns the request from the third requester to path A and the request from the first requester to path B. In path A, the timing controller issues an active command at clock period 3 and issues a read command at clock period 5. Then, during clock periods 7-10, the memory device places 4 clock period of data on the data buss. During the clock periods when data is being placed on the data buss for the first requester, the timing controller in path B issues an active command at clock period 7 and issues a read command at clock period 9. The memory device places data on the data buss during clock periods 11-14 for the second requester. Comparing the timing diagram of 16A to the timing diagram of 15A reveals that the data for the second requester is passed on the data buss during a period of time when the data buss would normally be unused in a one controller system. Thus, improved memory bandwidth is achievable with the two controller system of the present invention.

Figure 16B:
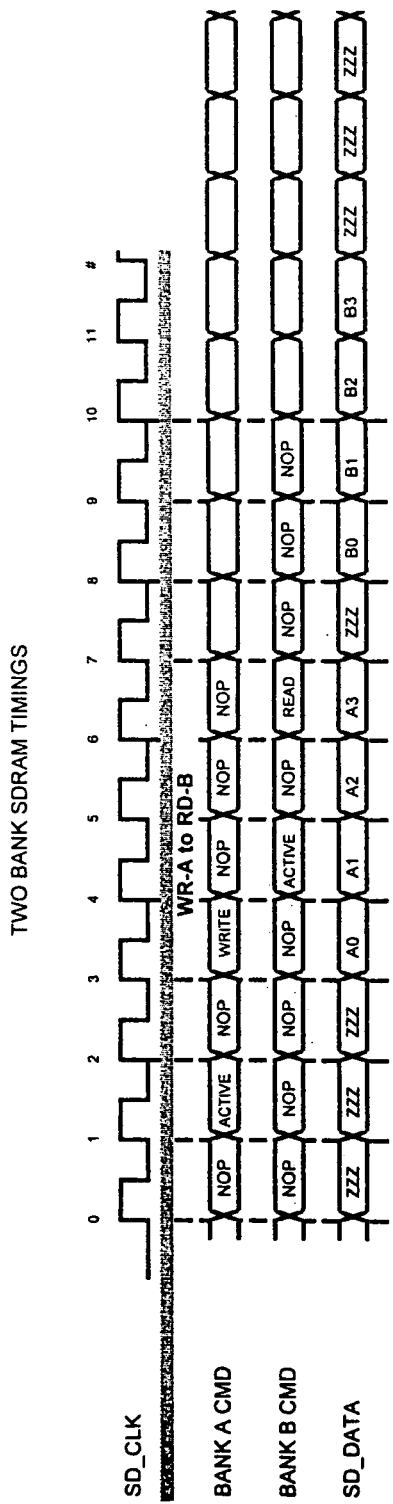

FIG. 16B depicts the timing for a write command followed by a read command. At clock period 1, the path A timing controller issues an active command for writing data to the memory device. At clock period 3, the path A timing controller issues a write command and data is written to the memory device during clock periods 3-6 in accordance with the request being processed by the path A timing controller. The path B timing controller issues an active command at clock period 4 and issues a read command at clock period 6. Data is then read from the memory device during clock periods 8-11. It is noted that the timing is such that one clock period of high impedance (ZZZ) is inserted on the data buss during clock period 7 between the data written to the memory device and the data read from the memory device. This delay is inserted to allow the data buss to clear for transitions from write to read and from read to write.

Figure 16C:
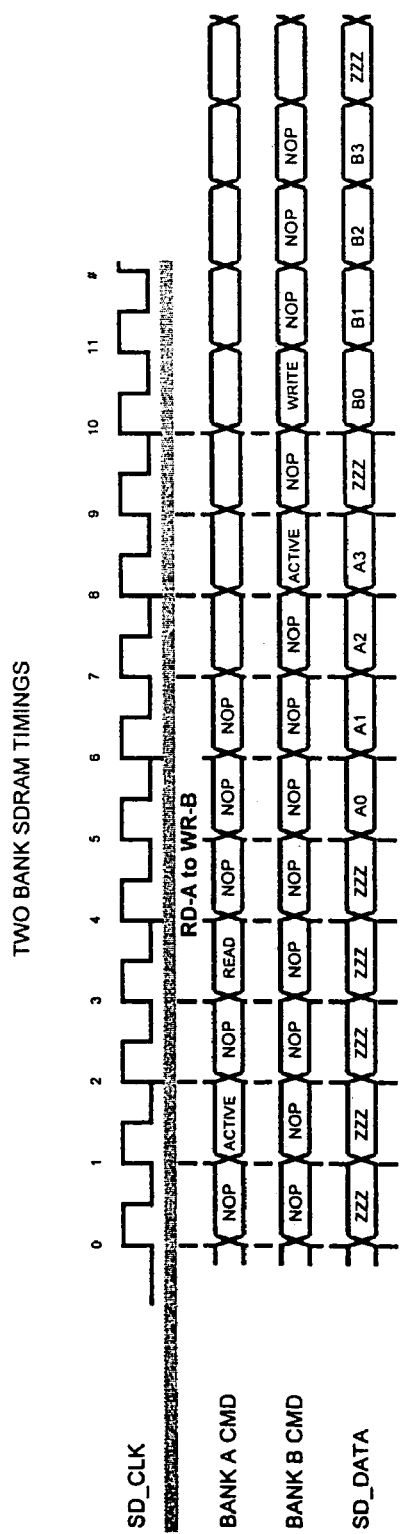

FIG. 16C depicts the timing for a read command followed by a write command. At clock period 1, the path A timing controller issues an active command for reading data from the memory device. At clock period 3, the path A timing controller issues a read command. During clock periods 5-8, data is read from the memory device in accordance with the request being processed by the path A timing controller. At clock period 8, the path B timing controller issues an active command and issues a write command at clock period 10. During clock periods 10-13, data is written to the memory device. It is noted that the timing is such that one clock period of high impedance (ZZZ) is inserted on the data buss during clock period 9 between the data written to the memory device and the data read from the memory device. As described above, this delay is inserted to allow the data buss to clear for transitions from write to read and from read to write.

Figure 16D:
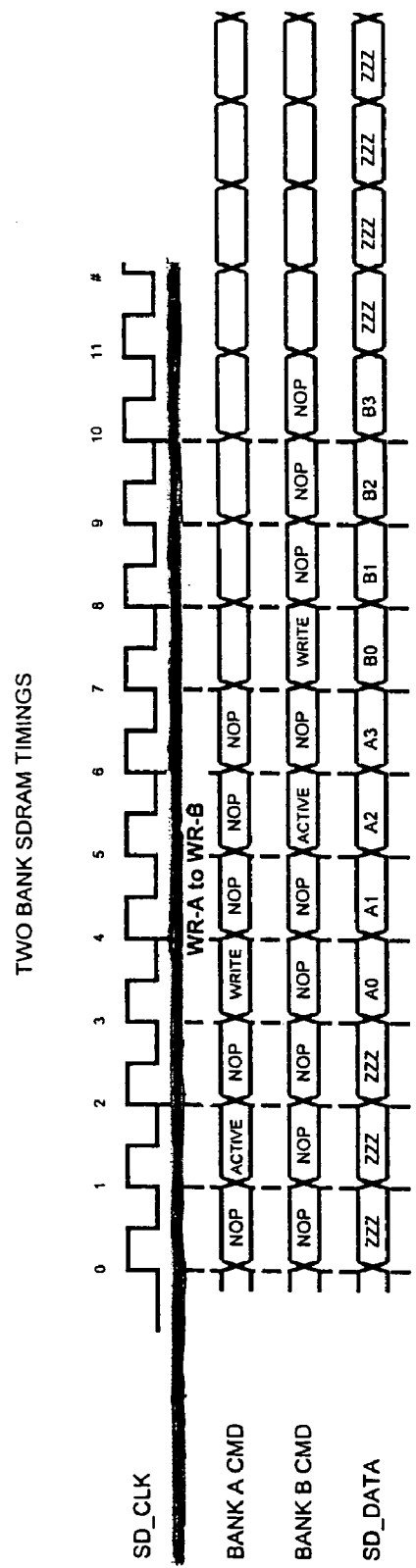

FIG. 16D depicts the timing for a write command followed by a write command. At clock period 1, the path A timing controller issues an active command. At clock period 3, the path A timing controller issues a write command. During clock periods 3-6, data is written to the memory device in accordance with the request being processed by the path A timing controller. At clock period 5, the path B timing controller issues an active command. At clock period 7, the path B timing controller issues a write command. During clock periods 7-10, data is written to the memory device. It is noted that since there is no transition from read to write or from write to read, it is not necessary to adjust the timing to include one clock period of high impedance (ZZZ) between the data associated with each request.

Referring back to FIG. 2, in certain exemplary embodiments, the memory device 102 (FIG. 2) includes two or more memory devices. These additional memory devices may be used to expand the width and/or the depth of the memory system. Expanding the width of the memory system refers to increasing the number of data bits, e.g., increasing from a dword (32 data bits) to a quadword (64 data bits). Expanding the depth of the memory system refers to increasing the number of address bits, with each additional address bit doubling the number of addressable memory locations.

In an exemplary embodiment, the width of the memory system is expanded by wiring two or more memory device in parallel. All common ports between the memory devices except the data ports and the memory device write enable ports (i.e., dqm in an SDRAM memory device) are connected together. In accordance with this embodiment, the data paths are modified to provide greater data and byte enable width such that the data path width matches the width of the memory system. For example, to expand the width of the memory system to 64 data bits, two 32 bit memory devices may be wired in parallel with half of the data bits (e.g., data bits 31 down to 0) and corresponding byte enable bits (e.g., byte enable bits 3 down to 0) coupled to the data and byte enable ports of one memory device. The other half of the data bits (e.g. data bits 63 down to 32) and corresponding byte enable bits (e.g., byte enable bits 7 down to 4) are then coupled to the data and byte enable ports of the other memory device.

Figure 17:
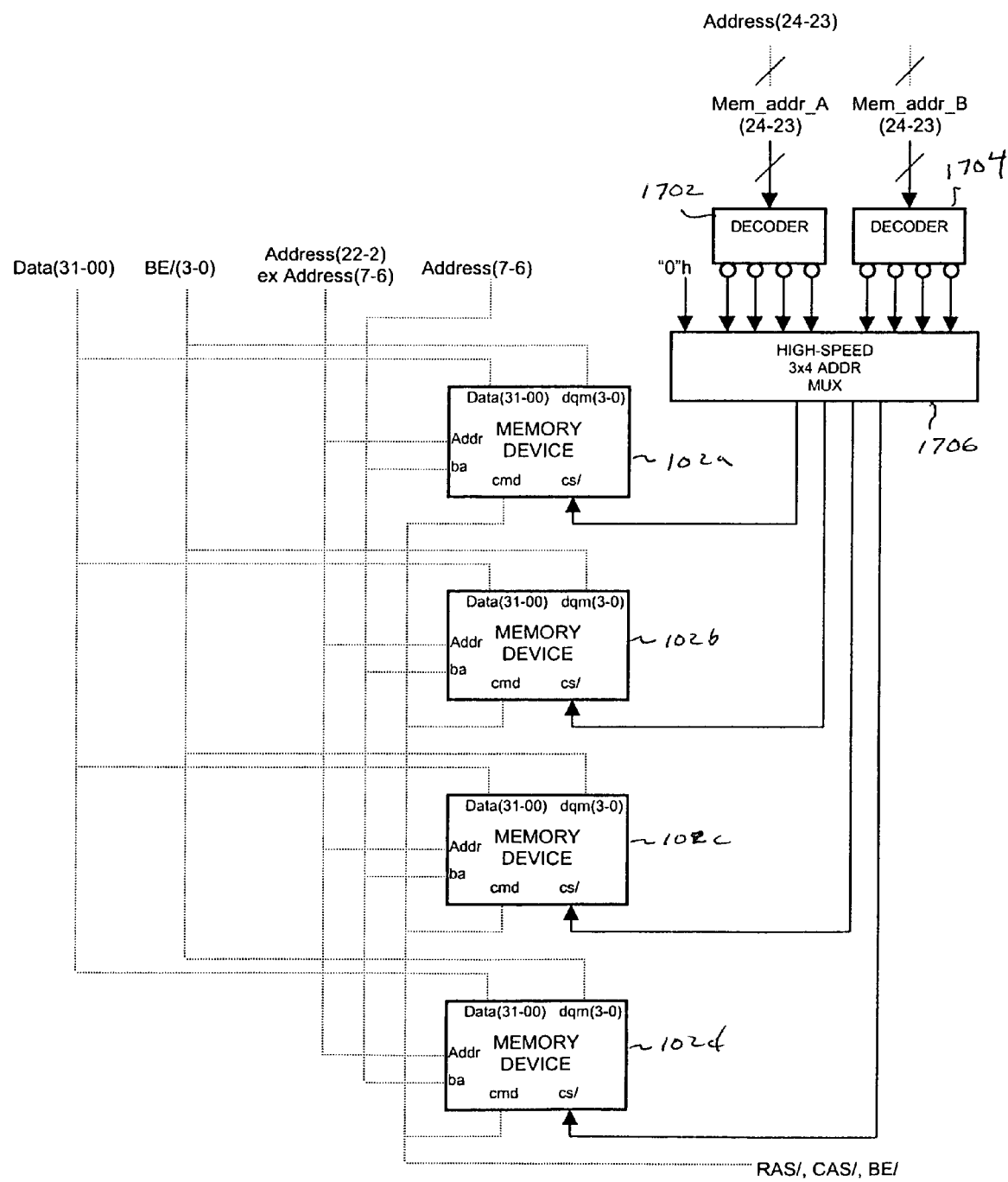
FIG. 17 is a block diagram of exemplary components for addressing multiple memory devices in accordance with one aspect of the present invention.

FIG. 17 depicts an exemplary embodiment in which the depth of the memory system is increased by "stacking" four memory devices 102a-d. In the illustrated embodiment, the address, data, and byte enable (e.g., dqm) paths and logic are the same as for the exemplary system described with reference to FIG. 2. Due to the increased number of addresses associated with the increase in depth of the memory system, additional address bits are included to access these additional addresses. In the illustrated embodiment, the addressable locations have increased four fold. Thus, two additional address bits (e.g., address bits 24 and 23) are included to enable access to all locations. The additional bits are applied to a path A decoder 1702 and a path B decoder 1704. In an exemplary embodiment, the decoders 1702 and 1704 are one-of-four selection decoders that express the decoded bits as negative logic. The resultant four bit select values are multiplexed in a 3_×_4 multiplexer 1706, which can be thought of as an extension to the address multiplexer 406 (FIG. 4). In addition, a "0"h value is applied to a third input of the 3_×_4 multiplexer 1706 for initialization of the memory devices 102. Each of the output ports of the 3_×_4 multiplexer 406 is coupled to a chip select (CS/) port of a unique memory device 102. The address bank compare logic (see FIG. 5) is also modified to accommodate the additional bits such that a four bit compare of the memory bank of a specific memory device is performed rather than a two bit compare of just the memory bank.

Note that the logic including four memory devices 102a-d and the associated extra addressing logic may be conceptualized as a single memory device having 16 internal memory banks and 4 bank address inputs instead of two. Thus, this single "virtual" memory device encompasses all the features of the four physical devices plus the additional addressing logic. In the illustrated embodiment, the new address bits 23 and 24 may be considered memory bank select bits because selecting the memory device can be considered the first step in selecting the internal memory bank of that memory device.

Although the invention is illustrated and described herein with reference to specific embodiments, the invention is not intended to be limited to the details shown. For example, the arbiter may be advantageously used with a single controller to assign the order of memory requests from multiple requesters. In addition, memory devices with fewer or more address bits and/or data bits may be employed. Various other modifications may be made in the details within the scope and range of equivalents of the claims and without departing from the invention.

What is claimed is:

1. A memory controller for managing memory requests from a plurality of requesters to a plurality of memory banks, the memory controller comprising:
    an arbiter having a plurality of request ports, each request port configured to receive the memory requests from a respective one of the plurality of requesters, the arbiter assigning a first memory request to a first processing path and a second memory request to a second processing path responsive to the memory banks requested by the received and assigned memory requests;
    a first path controller coupled to the arbiter and the plurality of memory banks, the first path controller configured to process the first memory request in the first processing path to activate a first memory bank associated with the first memory request for a first data transfer;
    a second path controller coupled to the arbiter and the plurality of memory banks, the second path controller configured to process the second memory request in the second processing path to activate, during the first data transfer, a second memory bank associated with the second memory request for a second data transfer; and
    a synchronizer coupled between the first path controller and the second path controller for synchronizing the first and second path controllers such that the first and second memory requests processed by the first and second path controllers, respectively, and the first and second data transfers do not conflict,
    wherein the arbiter assigns the first and second memory requests using a fairness algorithm, the fairness algorithm comparing the plurality of requesters to a grant history register, identifying from the plurality of requesters those requesters that have had previous memory requests granted during a current arbitration cycle, and identifying the first memory request by a first memory requester from the plurality of memory requesters not on the grant history register and not having a current request by the second path controller using fixed priority logic.

2. The memory controller of claim 1, wherein the arbiter, the first path controller, the second path controller, and the synchronizer are implemented as a single field programmable gate array.

3. The memory controller of claim 1, wherein the arbiter, the first path controller, the second path controller, and the synchronizer are configured for use with an SDRAM memory device comprising the first and second memory banks.

4. The memory controller of claim 1, wherein the first path controller comprises at least:
    first path circuitry that passes addresses and data associated with the first memory request;
    a first path timing controller that controls the first path circuitry and activates the first memory bank associated with the first memory request; and
    address and data multiplexers that multiplex addresses and data associated with the first memory request for interfacing with the memory banks; and
    wherein the second path controller comprises at least:
    second path circuitry that passes addresses and data associated with the second memory request;
    a second path timing controller that controls the second path circuitry and activates the second memory bank associated with the second memory request; and
    the address and data multiplexers that multiplex addresses and data associated with the first memory request, the address and data multiplexers further multiplexing addresses and data associated with the second memory request for interfacing with the memory banks.

5. The memory controller of claim 1, wherein the synchronizer comprises:
    delay circuits coupled between the first and second path controllers to set delay values therebetween to adjust the timing of the first and second path controllers during processing of the first and second memory requests responsive to the first and second memory requests.

6. The memory controller of claim 1, wherein the first path controller is further configured to initialize and refresh the plurality of memory banks.

7. The memory controller of claim 1, wherein the arbiter assigns the second memory request to the second path controller when the first path controller is active if the first and second memory banks are not the same memory bank.

8. An arbitration method for assigning at least one controller to manage a plurality of memory requests from a plurality of requesters to a memory device having at least one memory bank, each memory request associated with a unique requester, the at least one controller comprises a first path timing controller and a second path timing controller, the method comprising the steps of:
- receiving at a plurality of requests ports the plurality of memory requests from the plurality of memory requesters during a current arbitration cycle, each request port configured to receive the memory request from a respective one of the plurality of requesters;
- comparing the plurality of memory requesters to a grant history register to identify ones of the plurality of memory requesters that have not had previous memory requests granted during the current arbitration cycle;
- assigning a memory request to one of the at least one controllers from one of the identified plurality of memory requesters that have not had previous memory requests granted during the current arbitration cycle using fixed priority logic;
- adding the requester of the assigned memory request to the grant history register;
- receiving a first processing indicator at the first path timing controller representing a first processing requester of a first processing memory request being processed at the second path timing controller; and
- receiving a second processing indicator at the second path timing controller representing a second processing requester of a second processing memory request being processed at the first path timing controller;
- wherein the step of assigning the memory request comprises assigning a first memory request to the first path timing controller from the plurality of memory requesters not on the grant history register and not being processed by the second path controller using fixed priority logic and assigning a second memory request to the second path timing controller from the plurality of memory requesters not on the grant history register and not being processed by the first path timing controller using fixed priority logic.

9. The method of claim 8, wherein each requester is assigned a unique value and wherein the fixed priority logic performs the step of:
- identifying from the plurality of memory requesters not on the grant history register a lowest memory requester having a lowest value among the plurality of memory requesters not on the grant history register for assignment to one of the at least one controller.

10. The method of claim 8, wherein each requester is assigned a unique value and wherein the fixed priority logic comprises the steps of:
- identifying from the plurality of memory requesters not on the grant history register and not being processed by the second path timing controller a first lowest memory requester having a first lowest value among the plurality of memory requesters not on the grant history register and not being processed by the second path timing controller that is requesting access to a first memory bank not currently activated by the second path timing controller;
- identifying from the plurality of memory requesters not on the grant history register and not being processed by the first path timing controller a second lowest memory requester having a second lowest value among the plurality of memory requesters not on the grant history register and not being processed by the first path timing controller that is requesting access to a second memory bank not currently activated by the first path timing controller.

* * * * *